United States Patent
Yoshihara

(10) Patent No.: US 10,107,147 B2
(45) Date of Patent: Oct. 23, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Yasushi Yoshihara, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/638,692

(22) Filed: Jun. 30, 2017

(65) Prior Publication Data

US 2018/0010486 A1 Jan. 11, 2018

(30) Foreign Application Priority Data

Jul. 6, 2016 (JP) ................................. 2016-134462

(51) Int. Cl.
*F01L 1/26* (2006.01)
*F02B 31/08* (2006.01)
(Continued)

(52) U.S. Cl.
CPC ............ *F01L 1/267* (2013.01); *F02B 31/087* (2013.01); *F02D 13/023* (2013.01); *F02D 13/0257* (2013.01); *F02D 13/0261* (2013.01); *F02F 1/4221* (2013.01); *F01L 1/0532* (2013.01); *F01L 2001/186* (2013.01); *F01L 2003/251* (2013.01); *F01L 2009/0407* (2013.01); *F01L 2800/00* (2013.01); *F01L 2800/01* (2013.01); *F02B 1/06* (2013.01); *F02B 2031/006* (2013.01);
(Continued)

(58) Field of Classification Search
CPC ....... F01L 1/267; F01L 1/0532; F02F 1/4221; F02F 2001/245; F02F 1/4285; F02D 13/0261; F02D 13/023; F02B 2031/006; F02B 31/087; F02B 2275/48; F02B 1/06
See application file for complete search history.

(56) References Cited

U.S. PATENT DOCUMENTS 4,667,636 A 5/1987 Oishi et al.
5,575,254 A 11/1996 Tsuchida et al.
(Continued)

FOREIGN PATENT DOCUMENTS

JP S62-40224 U 3/1987
JP H02-47239 Y2 12/1990
(Continued)

*Primary Examiner* — Joseph Dallo
(74) *Attorney, Agent, or Firm* — Hunton Andrews Kurth LLP

(57) ABSTRACT

Intake holes at the opposite ends are opened and closed by first intake valves. The middle intake hole is opened and closed by a second intake valve. A control device includes an intake variable valve device. First branch channels are connected to the intake holes and produce a normal tumble flow. A second branch channel is configured such that the flow rate of intake air passing through the middle intake hole is relatively greater on the side closer to the outer periphery of the combustion chamber. Where increasing the flow coefficient is given a higher priority, a three-valve drive mode is selected. Where the strength of the normal tumble flow is enhanced, a two-valve drive mode is selected. Where production of the normal tumble flow is reduced, a one-valve drive mode is selected.

10 Claims, 11 Drawing Sheets

(51) Int. Cl.
*F02D 13/02* (2006.01)
*F01L 1/053* (2006.01)
*F02B 1/06* (2006.01)
*F02B 31/00* (2006.01)
*F02F 1/42* (2006.01)
*F02F 1/24* (2006.01)
*F01L 1/18* (2006.01)
*F01L 3/00* (2006.01)
*F01L 9/04* (2006.01)

(52) U.S. Cl.
CPC ......... *F02B 2275/48* (2013.01); *F02F 1/4285* (2013.01); *F02F 2001/245* (2013.01)

(56) References Cited

U.S. PATENT DOCUMENTS

| | | | | |
|---|---|---|---|---|
| 2001/0035142 | A1* | 11/2001 | Ebesu | F01L 1/024 123/90.17 |
| 2005/0098148 | A1* | 5/2005 | Kuzuyama | F02D 9/04 123/315 |
| 2006/0266311 | A1* | 11/2006 | Fujii | F01L 1/3442 123/90.15 |
| 2006/0288972 | A1* | 12/2006 | Hara | F01L 1/143 123/90.16 |
| 2010/0037840 | A1* | 2/2010 | Amano | F01L 3/06 123/90.5 |
| 2011/0146620 | A1* | 6/2011 | Kaneko | F02B 23/105 123/305 |
| 2015/0041699 | A1* | 2/2015 | Shigematsu | F02M 35/10255 251/306 |
| 2016/0032870 | A1* | 2/2016 | Nishida | F02M 25/03 123/25 C |
| 2016/0131087 | A1* | 5/2016 | Nishida | F01L 1/34 123/25 A |
| 2016/0195027 | A1 | 7/2016 | Mori et al. | |

FOREIGN PATENT DOCUMENTS

| | | |
|---|---|---|
| JP | H03-18624 A | 1/1991 |
| JP | H04-112919 A | 4/1992 |
| JP | H04-128534 A | 4/1992 |
| JP | H04-159419 A | 6/1992 |
| JP | H06-35834 B2 | 5/1994 |
| JP | H07-54618 A | 2/1995 |
| JP | H108967 A | 1/1998 |
| JP | 2909588 B2 | 6/1999 |
| JP | 2000265878 A | 9/2000 |
| JP | 2004293484 A | 10/2004 |
| JP | 2006329130 A | 12/2006 |
| JP | 2007077953 A | 3/2007 |
| JP | 2007146708 A | 6/2007 |
| JP | 2009041531 A | 2/2009 |
| JP | 2009103037 A | 5/2009 |
| JP | 2009264234 A | 11/2009 |
| JP | 2010031686 A | 2/2010 |
| JP | 2015052290 A | 3/2015 |
| KR | 20040097417 A * | 11/2004 |

* cited by examiner

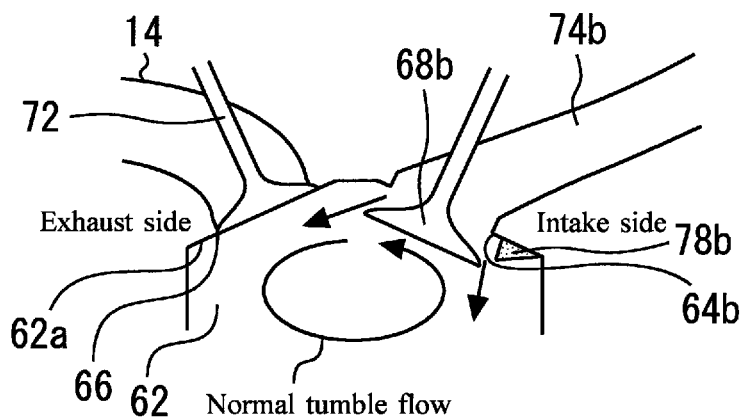
Fig. 3A
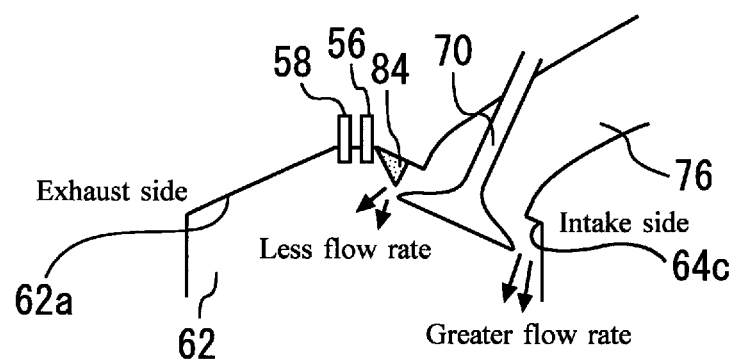
Fig. 3B
Fig. 4
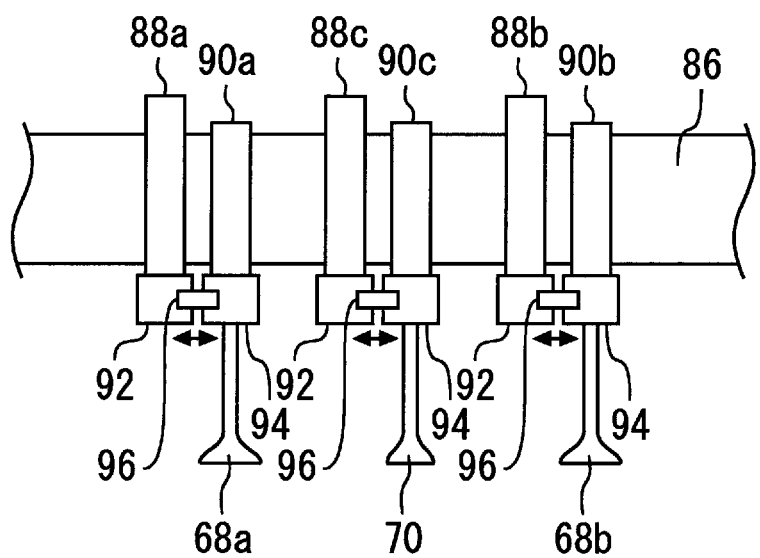

Fig. 5A  One-valve drive mode
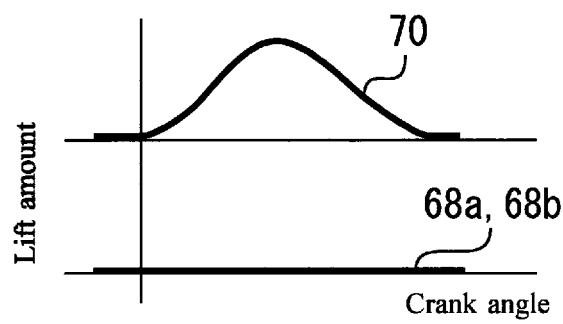
Fig. 5B  Two-valve drive mode
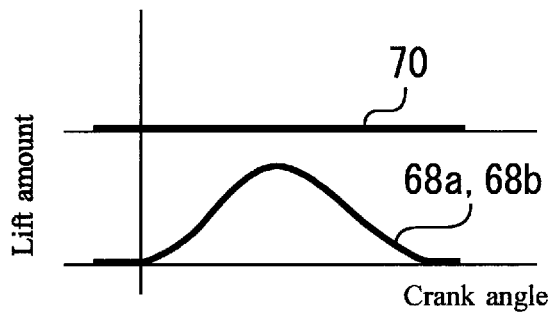
Fig. 5C  Three-valve drive mode
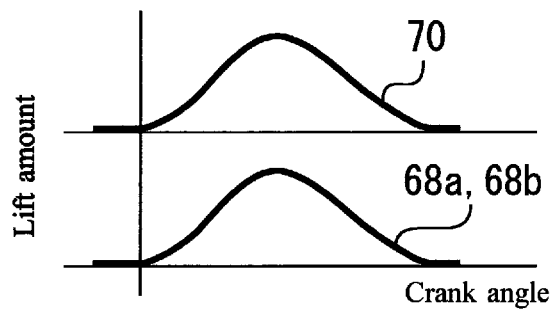

Fig. 12
Fig. 12A  One-valve drive mode
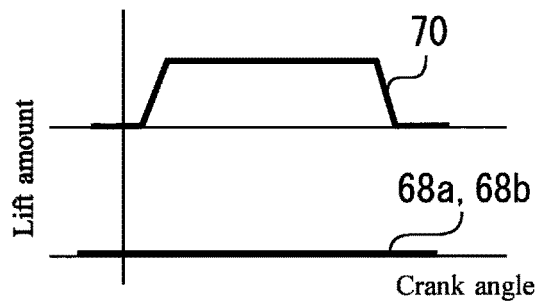
Fig. 12B  Two-valve drive mode
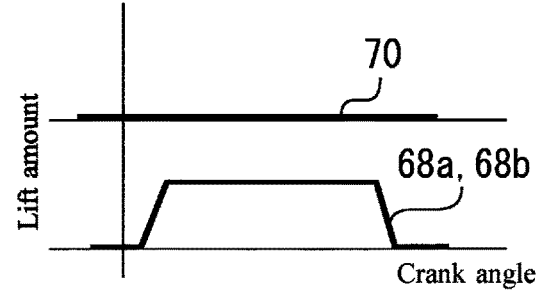
Fig. 12C  Three-valve drive mode (involving no late valve closing)
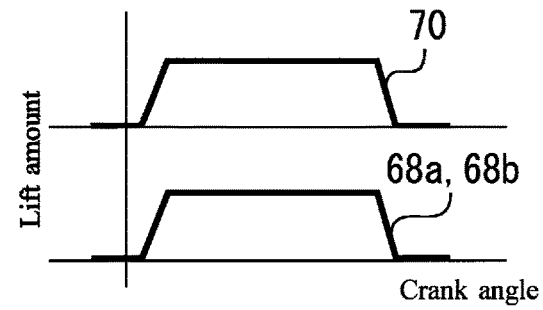
Fig. 12D  Three-valve drive mode (involving late valve closing)
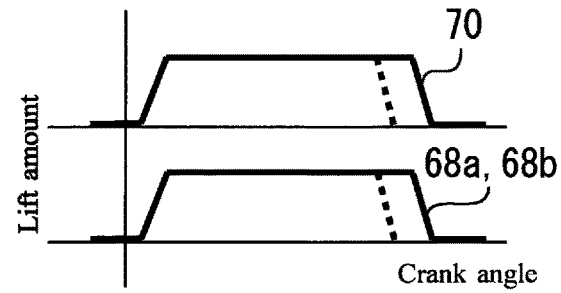

Fig. 13
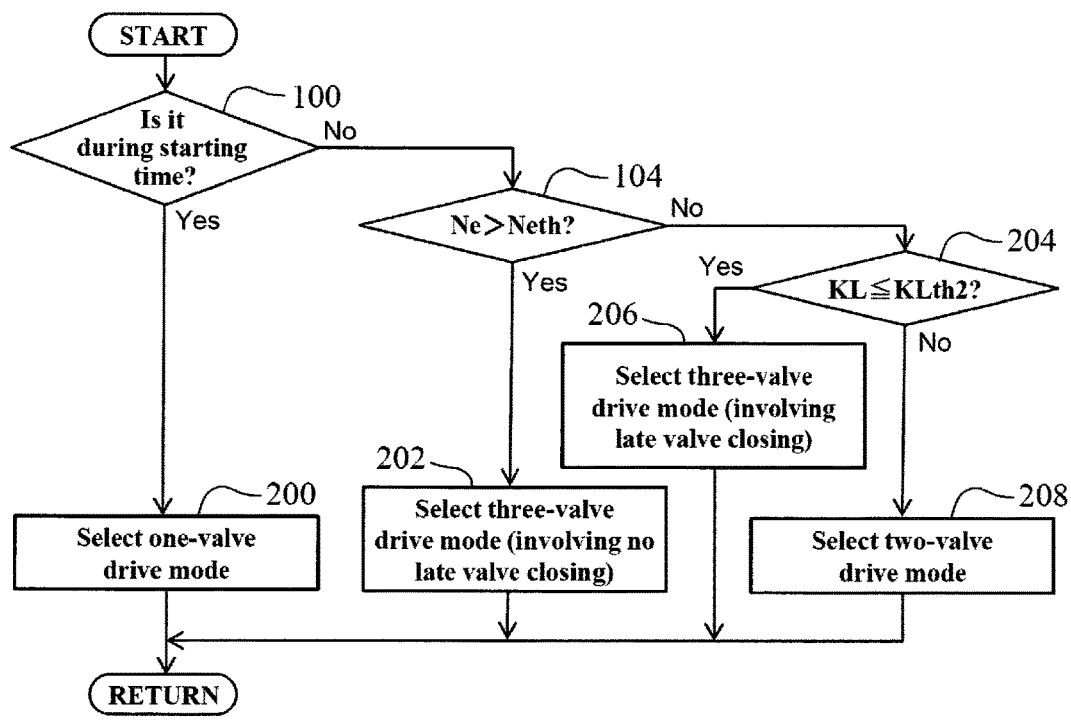
Fig. 14A                    Fig. 14B
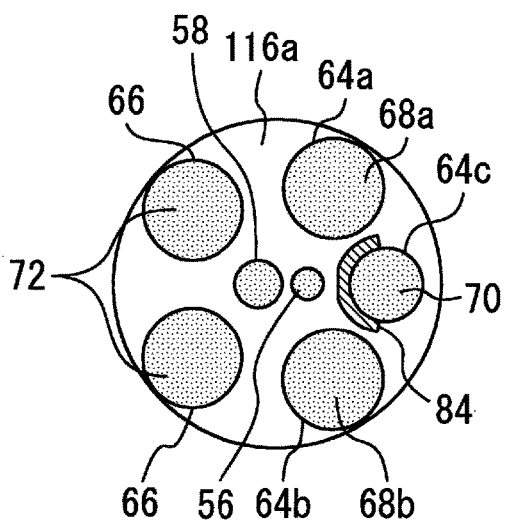 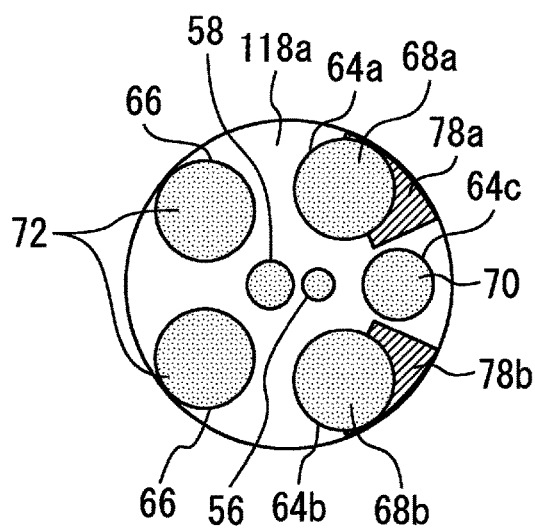

Fig. 15A    Three drive mode    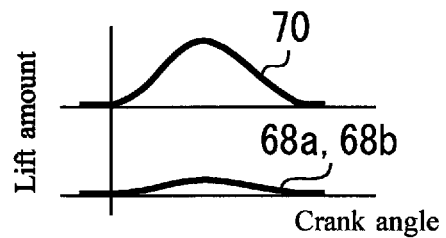
Fig. 15B    Second drive mode    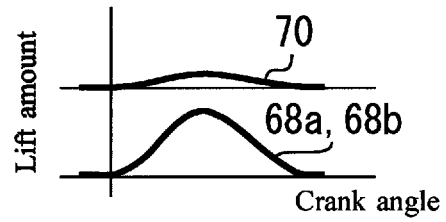
Fig. 15C    First drive mode    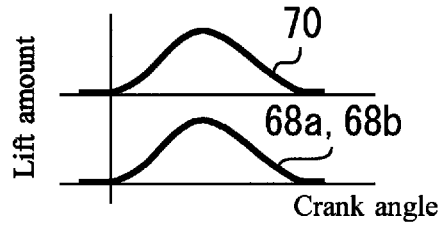
Fig. 16A    Three drive mode    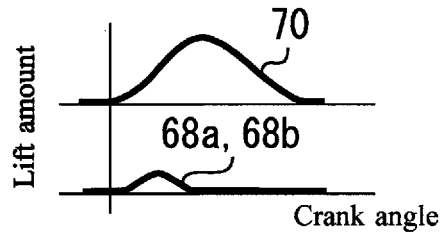
Fig. 16B    Second drive mode    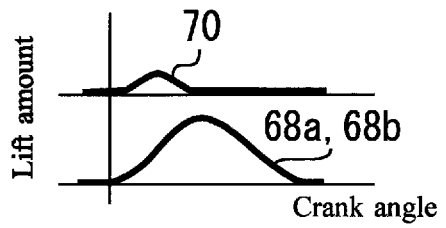
Fig. 16C    First drive mode    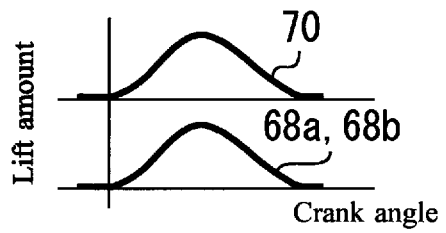

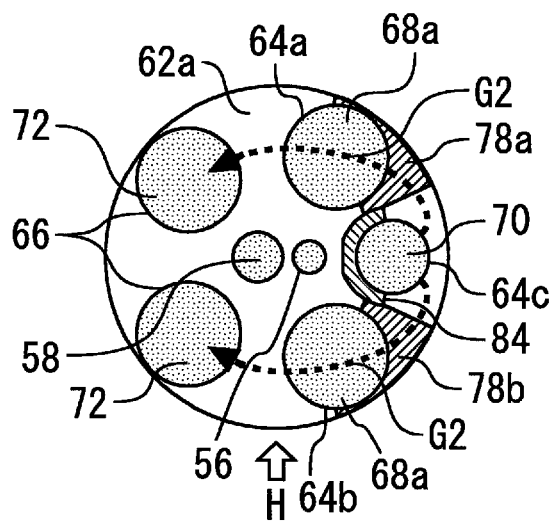
Fig. 22A
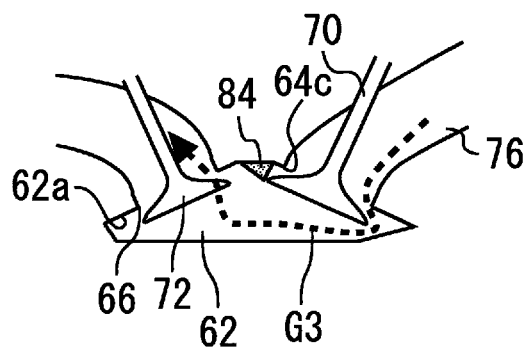
Fig. 22B
Fig. 23
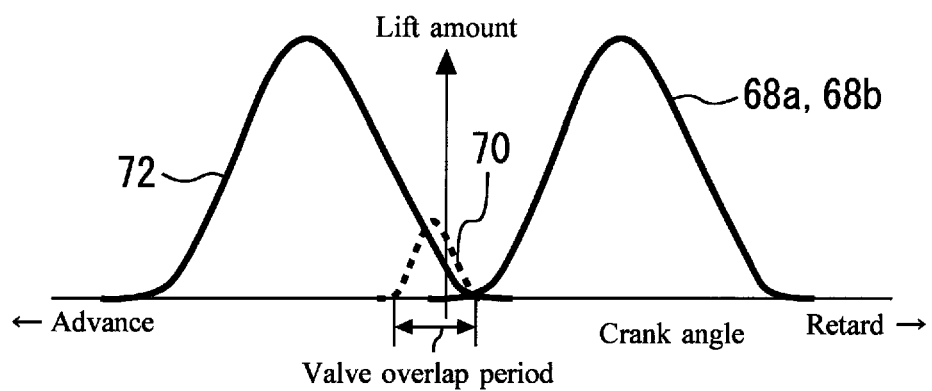

CONTROL DEVICE FOR INTERNAL COMBUSTION ENGINE

CROSS-REFERENCE TO RELATED APPLICATION

This application is based on and claims the benefit of Japanese Patent Application No. 2016-134462, filed on Jul. 6, 2017, which is incorporated by reference herein in its entirety.

BACKGROUND

Technical Field

The present disclosure relates to a control device for an internal combustion engine, and more particularly to a control device that is suitable for controlling an internal combustion engine in which three intake holes are formed in a combustion chamber top surface.

Background Art

For example, JP07-054618A discloses a multi-valve internal combustion engine provided with three intake holes and two exhaust holes formed in a combustion chamber top surface. The three intake holes are arranged along an arc about a spark plug. An intake channel of the internal combustion engine is branched in three directions toward the three intake holes, and the branch channels are connected to the three intake holes. First branch channels connected to the (two) intake holes at the opposite ends of the three intake holes are configured to produce a normal tumble flow that ascends on the intake side and descends on the exhaust side. A second branch channel connected to the (one) middle intake hole is configured to produce a reverse tumble flow that descends on the intake side and ascends on the exhaust side.

In the internal combustion engine described in JP07-054618A, three intake valves that open and close the three intake holes are driven with the same valve operation characteristics, that is, with the same timing of opening, the same timing of closing and the same lift amount.

JP07-054618A is a patent document which may be related to the present disclosure.

SUMMARY

A tumble flow is commonly used in an internal combustion engine of the spark ignition type in order to improve combustion. The required strength of the tumble flow depends on the operating condition of the internal combustion engine. A known device that controls the strength of the tumble flow is a tumble control valve disposed in the intake channel. However, when the tumble control valve is used to produce a biased flow in the intake channel, if the biased flow is produced at a position distant from the combustion chamber, the produced biased flow may be diffused before entering the cylinder, and it may be difficult to efficiently produce the tumble flow. In addition, the friction loss may increase on the wall of the intake channel because of the biased flow, and as a result, the pumping loss of the internal combustion engine may increase.

The present disclosure has been made to address the problem described above, and an object of the present disclosure is to provide a control device for an internal combustion engine that can satisfy a requirement for controlling the strength of a tumble flow according to the operating condition of the internal combustion engine without relying on a tumble control valve.

A control device for an internal combustion engine according to the present disclosure is configured to control an internal combustion engine that includes: a spark plug disposed at a combustion chamber top surface of a cylinder; a fuel injection valve configured to supply a fuel into the cylinder; three intake holes formed in the combustion chamber top surface, the area of a middle intake hole of the three intake holes being smaller than the sum of the areas of intake holes at opposite ends; at least one exhaust hole formed in the combustion chamber top surface; first intake valves configured to open and close the intake holes at the opposite ends; a second intake valve configured to open and close the middle intake hole; at least one exhaust valve configured to open and close the at least one exhaust hole; an intake variable valve device configured to separately control opening and closing of the first intake valves and opening and closing of the second intake valve; and an intake channel that includes first branch channels and a second branch channel. The first branch channels is connected to the intake holes at the opposite ends and is configured to produce a normal tumble flow that ascends on an intake side and descends on an exhaust side in the cylinder. The second branch channel is connected to the middle intake hole and is configured such that a flow rate of intake air passing through a space on a side opposite to a center of a combustion chamber is greater than a flow rate of intake air passing through a space on a side of the middle intake hole closer to the center of the combustion chamber. The control device is programmed, where increasing a flow coefficient of the first branch channels and the second branch channel is given a higher priority than enhancing a strength of the normal tumble flow, to control the intake variable valve device so as to select a first drive mode in which both the first intake valves and the second intake valve are opened and closed. The control device is programmed, where the strength of the normal tumble flow is enhanced, to control the intake variable valve device so as to select a second drive mode in which the first intake valves are opened and closed while the second intake valve is neither opened nor closed, or the first intake valves are opened and closed while at least one of a lift amount and an operating angle of the second intake valve is set to be smaller than at least one of a lift amount and an operating angle of the second intake valve in the first drive mode. The control device is programmed, where production of the normal tumble flow is reduced, to control the intake variable valve device so as to select a third drive mode in which the second intake valve is opened and closed while the first intake valves are neither opened nor closed, or the second intake valve is opened and closed while at least one of a lift amount and an operating angle of the first intake valves is set to be smaller than at least one of a lift amount and an operating angle of the first intake valves in the first drive mode.

The control device may be programmed to control the intake variable valve device so as to select the first drive mode if an engine speed is higher than a threshold, and control the intake variable valve device so as to select the second drive mode if the engine speed is equal to or lower than the threshold.

The internal combustion engine may include an EGR device that is configured to feed a part of exhaust gas flowing in an exhaust channel back to the intake channel as an EGR gas. The control device may be programmed to control the intake variable valve device so as to select the second drive mode if the EGR gas is fed back to the intake channel by using the EGR device.

The control device may be programmed to control the intake variable valve device so as to select the second drive mode if a lean combustion operation is performed at a lean air-fuel ratio higher than a stoichiometric air-fuel ratio.

The control device may be programmed to control the intake variable valve device so as to select the first drive mode if an Atkinson cycle is used by retarding or advancing a timing of closing of at least one of the first intake valves and the second intake valve.

The control device may be programmed to control the intake variable valve device so as to select the second drive mode in a knock region on a low-engine-speed and high-load side.

The control device may be programmed to control the intake variable valve device so as to select the third drive mode if a stratified charge combustion operation is performed at a time of starting of the internal combustion engine.

Of the three intake holes, the middle intake hole may be disposed farthest from the at least one exhaust hole. A first mask part may be provided around the middle intake hole in a form of a protrusion that surrounds the middle intake hole on a side closer to the center of the combustion chamber in a direction perpendicular to an axis of a crankshaft in a view of the combustion chamber top surface viewed from below along an axis of the cylinder. A valve overlap period in which only a period in which the second intake valve is open overlaps with a period in which the at least one exhaust valve is open may be provided if the first drive mode is selected in a scavenging region where an intake air pressure is higher than an exhaust gas pressure.

A first mask part may be provided around the middle intake hole in a form of a protrusion that surrounds the middle intake hole on a side closer to the center of the combustion chamber in a direction perpendicular to an axis of a crankshaft in a view of the combustion chamber top surface viewed from below along an axis of the cylinder.

Second mask parts may be provided around the intake holes at the opposite ends in a form of a protrusion that surrounds a corresponding intake hole on a side closer to an outer periphery of the combustion chamber in a direction perpendicular to an axis of a crankshaft in a view of the combustion chamber top surface viewed from below along an axis of the cylinder.

According to the control device for an internal combustion engine of the present disclosure, where increasing the flow coefficient of the first branch channels and the second branch channel is given a higher priority than enhancing the strength of the normal tumble flow, the intake variable valve device is controlled so as to select the first drive mode. In the first drive mode, compared with the second and third drive modes, an increase of the resistance to the intake air can be avoided, so that a high flow rate can be achieved. According to the control device, where the strength of the normal tumble flow is enhanced, the intake variable valve device is controlled so as to select the second drive mode. In the second drive mode, opening and closing of the second intake valve associated with the second branch channel that produces an air flow that acts to weaken the normal tumble flow is stopped or restricted. In the first drive mode, the normal tumble flow produced by the intake air from the intake holes at the opposite ends is weakened by the air flow from the middle intake hole, whose flow rate is higher in the vicinity of the outer periphery of the combustion chamber. Thus, in the second drive mode, the strongest normal tumble flow can be produced among the three drive modes. In other words, a high tumble flow can be achieved. Furthermore, according to the control device, where production of the normal tumble flow is reduced, the intake variable valve device is controlled so as to select the third drive mode. In the third drive mode, opening and closing of the first intake valves associated with the first branch channels that produce the normal tumble flow is stopped or restricted. Thus, in the third drive mode, production of the normal tumble flow can be reduced. Thus, according to the control device, the requirement for controlling the strength of the tumble flow according to the operating condition of the internal combustion engine can be satisfied without relying on a tumble control valve.

BRIEF DESCRIPTION OF THE DRAWINGS

FIGS. 3A and 3B are schematic diagrams showing a configuration of the cylinder and its periphery;

FIG. 4 is a schematic diagram showing a configuration of an intake variable valve device according to the first embodiment;

FIGS. 5A to 5C show valve lift curves for illustrating different drive modes of intake valves achieved by the intake variable valve device according to the first embodiment;

FIGS. 12A to 12D show valve lift curves for illustrating different drive modes of the intake valves achieved by the intake variable valve device according to the third embodiment;

FIG. 13 is a flow chart showing a processing performed by the ECU in the third embodiment;

FIGS. 14A and 14B show other examples of mask parts;

FIGS. 15A to 15C show valve lift curves for illustrating another example of drive modes of the intake valves;

FIGS. 16A to 16C show valve lift curves for illustrating another example of drive modes of the intake valves;

FIGS. 22A and 22B are diagrams for illustrating reduction of blow-by of a fresh air and achievement of efficient scavenging by the control according to the fourth embodiment; and FIG. 23 is a diagram for illustrating another method of making only the period in which the second intake valve is open overlap with the period in which the exhaust valve is open.

DETAILED DESCRIPTION

Figure 1:
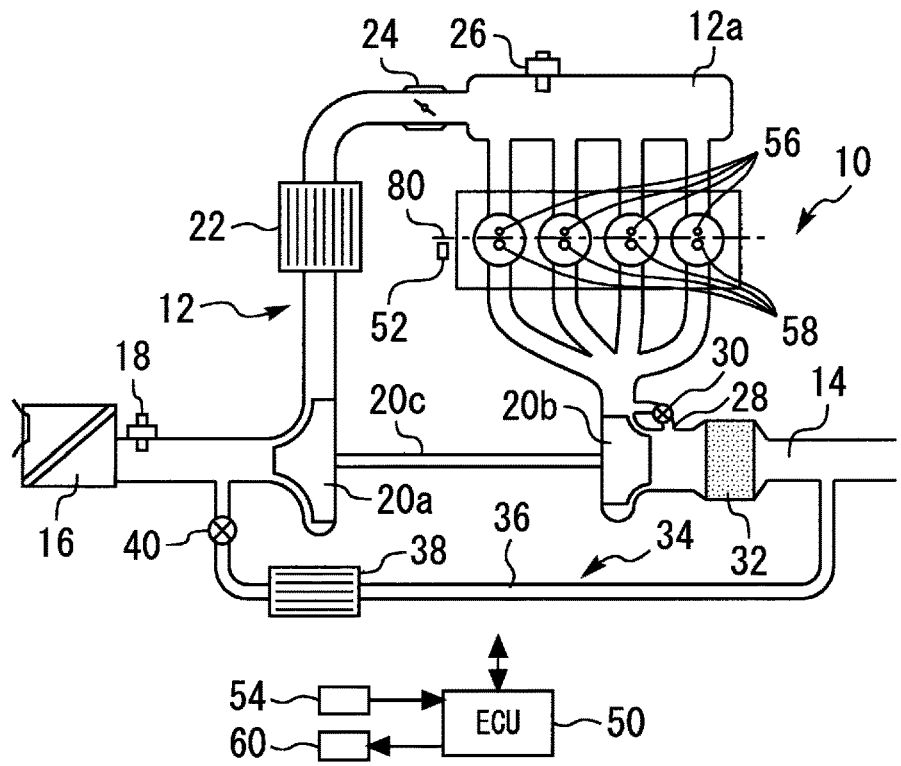
FIG. 1 is a diagram for illustrating a configuration of a system according to a first embodiment.

In the following, embodiments according to the present disclosure will be described with reference to the drawings. The same components in the drawings are denoted by the same reference numerals, and redundant descriptions thereof will be omitted. The embodiments described below are not intended to limit the present disclosure.

First Embodiment

Description of Configuration of System According to First Embodiment (Overall Configuration)

FIG. 1 is a diagram for illustrating a configuration of a system according to a first embodiment. The system according to this embodiment includes an internal combustion engine 10 of the spark ignition type. The internal combustion engine 10 is a supercharged engine, for example. However, the internal combustion engine to which the present disclosure can be applied may be a naturally aspirated engine.

Each cylinder of the internal combustion engine 10 is in communication with an intake channel 12 and an exhaust channel 14. An air cleaner 16 is attached to the intake channel 12 at a position close to an inlet of the intake channel 12. An air flow sensor 18 that outputs a signal that is responsive to the flow rate of air taken into the intake channel 12 is provided in the vicinity of, and downstream of, the air cleaner 16.

The internal combustion engine 10 includes a turbo-supercharger 20, as an example of a supercharger. A compressor 20a of the turbo-supercharger 20 is provided downstream of the air flow sensor 18. The compressor 20a is integrally coupled to a turbine 20b disposed in the exhaust channel 14 by a coupling shaft 20c.

An intercooler 22, which cools the air compressed by the compressor 20a, is provided downstream of the compressor 20a. An electronically controlled throttle valve 24 is provided downstream of the intercooler 22. An intake air pressure sensor 26 that detects the pressure of intake air is attached to the intake channel 12 at a position downstream of the throttle valve 24 (for example, at a surge tank 12a).

An exhaust bypass channel 28 that bypasses the turbine 20b between the inlet side and the outlet side of the turbine 20b is connected to the exhaust channel 14. The exhaust bypass channel 28 is provided with an electronically controlled waste gate valve (WGV) 30 that opens and closes the exhaust bypass channel 28. Furthermore, an exhaust gas purification catalyst 32 that purifies the exhaust gas is disposed in the exhaust channel 14 at a position downstream of the turbine 20b.

The internal combustion engine 10 shown in FIG. 1 includes an EGR device 34 configured to feed a part of the exhaust gas in the exhaust channel 14 back to the intake channel 12 as an EGR gas. The EGR device 34 is of the low pressure loop (LPL) type, for example, and includes an EGR channel 36 that connects a part of the exhaust channel 14 downstream of the turbine 20b and a part of the intake channel 12 upstream of the compressor 20a to each other. Viewed from the upstream side of the flow of the EGR gas fed back to the intake channel 12 through the EGR channel 36, the EGR channel 36 includes an EGR cooler 38 and an EGR valve 40 in this order. The EGR valve 40 is provided to adjust the amount of the EGR gas. As an alternative to the LPL type described above, any other types such as the high pressure loop (HPL) type may be used for introduction of the EGR gas.

As shown in FIG. 1, the system according to this embodiment includes an electronic control unit (ECU) 50. The ECU 50 includes a random access memory (RAM), a read only memory (ROM), and a central processing unit (CPU), for example. The ECU 50 receives and processes signals from various sensors provided in a vehicle on which the internal combustion engine 10 is mounted. The various sensors include not only the air flow sensor 18 and the intake air pressure sensor 26 described above but also at least a crank angle sensor 52 for detecting the engine speed and an accelerator position sensor 54 that detects the amount of depression of an accelerator pedal of the vehicle (accelerator position). The ECU 50 processes the signals received from the sensors and controls operation of various actuators according to predetermined control programs. The actuators that operate under the control of the ECU 50 include not only the throttle valve 24, the WGV 30 and the EGR valve 40 described above but also at least a fuel injection valve 56 that supplies a fuel to each cylinder of the internal combustion engine 10, an ignition device that ignites the air-fuel mixture in each cylinder (other components thereof than a spark plug 58 are not shown in the drawing), and an intake variable valve device 60 (see FIG. 4 described later). According to this embodiment, the fuel injection valve 56 is configured to inject the fuel directly into the cylinder, for example.

(Configuration of Cylinder and its Periphery)

Figure 2:
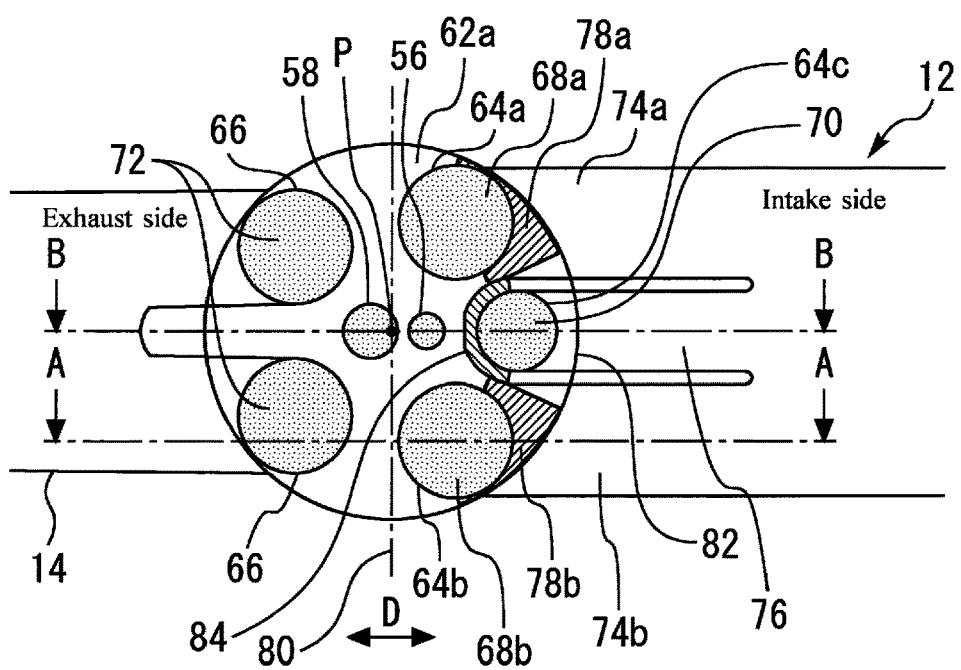
FIG. 2 shows a combustion chamber top surface of a cylinder viewed from below along the axis of the cylinder.

FIG. 2 shows a combustion chamber top surface 62a of a cylinder 62 viewed from below along the axis of the cylinder. FIGS. 3A and 3B are schematic diagrams showing a configuration of the cylinder 62 and its periphery. More specifically, FIG. 3A is a cross-sectional view of the cylinder 62 and its periphery taken along the line A-A in FIG. 2, and FIG. 3B is a cross-sectional view of the cylinder 62 and its periphery taken along the line B-B in FIG. 2. Although FIG. 3A shows the configuration on the side of an intake hole 64b, the cylinder 62 and its periphery are configured in the same manner on the side of an intake hole 64a.

As shown in FIG. 2, the fuel injection valve 56 and the spark plug 58 are disposed on the combustion chamber top surface (also referred to simply as a "top surface" hereinafter) 62a of each cylinder 62. According to this embodiment, the fuel injection valve 56 and the spark plug 58 are disposed around the center of the top surface 62a, for example. In the top surface 62a, three intake holes 64 (64a, 64b, and 64c) and two exhaust holes 66 are formed. The number of the exhaust holes 66 formed in the top surface 62a is not limited to two, as far as at least one exhaust hole 66 is formed.

According to this embodiment, the three intake holes 64a, 64b, and 64c are arranged along, for example, an arc about the axis of the cylinder. In FIG. 2, the point P represents a cylinder center point (combustion chamber center point) through which the axis of the cylinder passes. Of the three intake holes 64, the intake holes 64a and 64b, which are located at the opposite ends, are opened and closed by first intake valves 68 (68a and 68b), respectively. The remaining intake hole 64c (which is located at the middle) is opened and closed by a second intake valve 70. The two exhaust holes 66 are opened and closed by respective exhaust valves 72. In the following description, the side where the three intake holes 64 are located in the combustion chamber top surface 62a will be referred to as an "intake side", and the opposite side (where the two exhaust holes 66 are located) will be referred to as an "exhaust side".

The three intake holes 64 are ends of the intake channel 12. That is, the intake channel 12 is branched to form the three intake holes 64. The branches of the intake channel 12 are first branch channels 74 (74a and 74b ) and a second branch channel 76. The first branch channels 74 are provided in a pair and connected to the intake holes 64a and 64b located at the opposite ends. The second branch channel 76 is connected to the intake hole 64c located at the middle.

The first branch channels 74 and the second branch channel 76 are configured to be suitable for producing an air flow in the cylinder 62 as described below. Specifically, as shown in FIG. 3A, the first branch channels 74 are shaped to produce a normal tumble flow that ascends on the intake side and descends on the exhaust side in the cylinder 62. According to this embodiment, second mask parts 78 (78a and 78b) are formed in the top surface 62a at positions close to the intake holes 64a and 64b at the opposite ends (that is, positions close to the exits of the first branch channels 74), respectively.

In the view of the top surface 62a viewed from below along the axis of the cylinder as shown in FIG. 2, the second mask parts 78 are provided on the top surface 62a in the form of protrusions that surround the intake holes 64a and 64b at the opposite ends on the side of a combustion chamber outer periphery 82 in a direction perpendicular to an axis L1 of a crankshaft 80 (also referred to simply as a "perpendicular direction D", hereinafter). With the second mask part 78 provided on the top surface 62a, as shown in FIG. 3A, the intake air flowing into the cylinder 62 from the first branch channel 74 is less likely to flow to the space where the second mask part 78 is provided because the gap is narrowed by the second mask part 78, and is more likely to flow toward the center of the combustion chamber where the second mask part 78 is not provided. As a result, the intake air flowing into the cylinder 62 can be gathered on the side of the center of the combustion chamber. In this way, the second mask part 78 can help the first branch channel 74 produce the normal tumble flow.

On the other hand, as shown in FIG. 3B, the second branch channel 76 is shaped such that the flow rate of the intake air flowing to the side opposite to the center of the combustion chamber (that is, the space closer to the combustion chamber outer periphery 82 than the center of the combustion chamber) is greater than the flow rate of the intake air flowing to the side of the middle intake hole 64c closer to the center of the combustion chamber. In addition, according to this embodiment, a first mask part 84 is formed on the top surface 62a at a position near the middle intake hole 64c (that is, a position near the exit of the second branch channel 76).

In the view of the top surface 62a viewed from below along the axis of the cylinder as shown in FIG. 2, the first mask part 84 is provided on the top surface 62a in the form of a protrusion that surrounds the middle intake hole 64c on the side of the center of the combustion chamber in the perpendicular direction D. With the first mask part 84 provided on the top surface 62a, as shown in FIG. 3B, the intake air flowing into the cylinder 62 from the second branch channel 76 is less likely to flow to the space where the first mask part 84 is provided because the gap is narrowed by the first mask part 84, and is more likely to flow toward the combustion chamber outer periphery where the first mask part 84 is not provided. As a result, the intake air flowing into the cylinder 62 can be gathered on the side of the combustion chamber outer periphery. In this way, the first mask part 84 can help the second branch channel 76 produce such an in-cylinder air flow that the flow rate of the intake air flowing to the space close to the combustion chamber outer periphery is higher than the flow rate of the intake air flowing to the space close to the center of the combustion chamber.

(Configuration of Intake Variable Valve Device)

FIG. 4 is a schematic diagram showing a configuration of the intake variable valve device 60. The first intake valves 68a and 68b and the second intake valve 70 are opened and closed by the intake variable valve device 60. The arrangement shown in FIG. 4 is provided for each cylinder. The configuration of the intake variable valve device 60 shown as an example in FIG. 4 is known and thus will be only briefly described. As an alternative to the intake variable valve device 60, any other known intake variable valve device may be used as far as the device can operate in different drive modes shown in FIGS. 5A to 5C described later. The valve device that opens and closes the exhaust valve 72 is not particularly limited and thus will not be described herein.

The intake variable valve device 60 includes a cam shaft 86. The cam shaft 86 is coupled to the crankshaft 80 by a timing pulley and a timing chain (or timing belt), both of which are not shown in the drawing. The cam shaft 86 is rotated by the rotational force of the crankshaft 80 at a speed that is half of the speed of the crankshaft 80.

As shown in FIG. 4, the cam shaft 86 is provided with a first cam 88 (88a to 88c) and a second cam 90 (90a to 90c) for each of the three intake valves 68a, 68b and 70. The first cams 88a to 88c have a profile that allows opening and closing of the intake valves 68 and 70 with predetermined valve operation characteristics (timing of opening, timing of closing, and lift amount). The second cams 90a to 90c are zero lift cams having only a circular base part.

A first rocker arm 92 is disposed for each of the first cams 88a to 88c, and the pressing force of the first cams 88a to 88c is transferred to the first rocker arm 92. A second rocker arm 94 is disposed between each of the second cams 90a to 90c and a corresponding one of the intake valves 68a, 68b and 70. The first rocker arm 92 and the second rocker arm 94 operate integrally with each other or independently of each other, and the operation of the first and second rocker arms is switched by a coupling pin 96 moving to couple the first and second rocker arms to each other or to decouple the first and second rocker arms from each other.

The intake variable valve device 60 includes a hydraulic control part (not shown) capable of separately controlling the movement of the coupling pins 96 for the first intake valves 68 and the movement of the coupling pin 96 for the second intake valve 70. The intake valves 68 and 70 are biased to be closed by a valve spring (not shown). The intake variable valve device 60 further includes a lost motion spring (not shown) that biases the first rocker arm 92 such that the first rocker arm 92 is pressed against the first cam 88.

In the state where the first rocker arm 92 and the second rocker arm 94 are coupled to each other by the coupling pin 96, the pressing force of the first cam 88 is transferred to the intake valve 68 or 70 via the first rocker arm 92 and the second rocker arm 94, and therefore, the intake valve 68 or 70 performs an opening and closing operation according to the profile of the first cam 88. On the other hand, in the state where the first rocker arm 92 and the second rocker arm 94 are decoupled from each other, the pressing force of the first cam 88 is not transferred to the second rocker arm 94, and the second cam 90 applies no pressing force to the second rocker arm 94 because the second cam 90 is a zero lift cam. Therefore, in this state, the intake valve 68 or 70 is maintained in the closed state.

FIGS. 5A to 5C show valve lift curves for illustrating different drive modes of the intake valves 68a, 68b and 70 achieved by the intake variable valve device 60 according to the first embodiment. More specifically, FIG. 5A shows a "one-valve drive mode" where only the opening and closing operation of the second intake valve 70 is performed, and the opening and closing operation of the first intake valves 68a and 68b is not performed. The one-valve drive mode can be achieved by the ECU 50 issuing to the hydraulic control part a command to decouple the first rocker arms 92 and the second rocker arms 94 for the first intake valves 68a and 68b from each other.

FIG. 5B shows a "two-valve drive mode" where only the opening and closing operation of the first intake valves 68a and 68b is performed, and the opening and closing operation of the second intake valve 70 is not performed. The two-valve drive mode can be achieved by the ECU 50 issuing to the hydraulic control part a command to decouple the first rocker arm 92 and the second rocker arm 94 for the second intake valve 70 from each other.

FIG. 5C shows a "three-valve drive mode" where the opening and closing operation of all the intake valves 68a, 68b and 70 is performed. The three-valve drive mode can be achieved by the ECU 50 issuing to the hydraulic control part a command to maintain the coupling between the first rocker arms 92 and the second rocker arms 94 for all of the intake valves 68a, 68b and 70. In the example of the configuration of the intake variable valve device 60 according to this embodiment, in the three-valve drive mode, the first intake valves 68 and the second intake valve 70 are opened and closed with the same valve operation characteristics (specifically, lift amount, timing of opening, and timing of closing).

Control According to First Embodiment (In-Cylinder Air Flow Characteristics Achieved by Intake Variable Valve Device)

As described above, the first branch channel 74 allows production of the normal tumble flow, and the second branch channel 76 allows the flow rate of the intake air flowing to the space on the side opposite to the center of the combustion chamber to be greater than the flow rate of the intake air flowing to the space on the side of the middle intake hole 64c closer to the center of the combustion chamber. The combination of the first branch channel 74 and second branch channel 76 thus configured and the intake variable valve device 60 configured as described above allows the air flow in the cylinder 62 to be controlled in the three modes described below. The control of the in-cylinder air flow in the three modes described below is on the assumption that the area of the middle intake hole 64c is smaller than the sum of the areas of the two intake holes 64a and 64b at the opposite ends.

Specifically, in the three-valve drive mode, unlike the two-valve drive mode and the one-valve drive mode, an increase of the resistance to the intake air due to a valve stopping operation can be avoided, so that a high flow rate can be achieved. Furthermore, in the three-valve drive mode, the normal tumble flow formed by the intake air from the intake holes 64a and 64b at the opposite ends can be made weaker than in the two-valve drive mode by the air flow from the middle intake hole 64c whose flow rate is higher in the space close to the combustion chamber outer periphery.

In the two-valve drive mode, the first intake valves 68a and 68b, which are associated with the first branch channels 74a and 74b that produce the normal tumble flow, are opened and closed, whereas the second intake valve 70, which is associated with the second branch channel 76 that produces the air flow that acts to make the normal tumble flow weaker, is neither opened nor closed. Thus, the normal tumble flow is strongest in the two-valve drive mode among the three drive modes. That is, a high tumble flow can be achieved. Furthermore, at the same engine load and the same engine speed, the flow rate of the intake air flowing into the cylinder 62 in the two-valve drive mode is lower than the flow rate of the intake air in the three-valve drive mode because the middle intake hole 64c is closed.

In the one-valve drive mode, the first intake valves 68a and 68b, which are associated with the first branch channels 74a and 74b that produce the normal tumble flow, are neither opened nor closed, whereas the second intake valve 70, which is associated with the second branch channel 76 that produces the air flow that acts to make the normal tumble flow weaker, is opened and closed. Thus, in the one-valve drive mode, production of the normal tumble flow is reduced. Furthermore, since intake air is introduced from only the middle intake hole 64c, the flow rate of the intake air is lowest in the one-valve drive mode among the three drive modes, and a low flow rate can be achieved.

As described above, since one of the three drive modes described above can be selected in the internal combustion engine 10 including the branch channels 74 and 76, whether to produce or reduce the normal tumble flow in the cylinder 62 can be controlled, and the strength of the produced normal tumble flow can also be controlled. In this way, with the configuration according to this embodiment, the strength of the tumble flow can be controlled without the need for a tumble control valve in the intake channel 12.

Furthermore, with the configuration according to this embodiment, three different combinations of the strength of the normal tumble flow and the flow rate of the intake air can be provided simply by changing the combination of the operative state (opening and closing) and the inoperative state of the first intake valves 68 and the second intake valve 70 during operation of the internal combustion engine 10. Furthermore, the air flow from the intake holes 64a to 64c into the cylinder 62 is controlled by controlling whether to allow operation of the first intake valves 68 and the second intake valve 70. In this way, compared with an arrangement that uses a tumble control valve provided at a distance from the intake holes, the range of variation of the strength of the normal tumble flow can be more easily widened.

As shown in FIG. 2, according to this embodiment, the diameter of the middle intake hole 64c (and the second intake valve 70 that opens and closes the intake hole 64c) is smaller than the diameter of the intake holes 64a and 64b at the opposite ends (and the first intake valves 68a and 68b that open and close the intake holes 64a and 64b). However, the middle intake hole 64c may have any diameter that meets the requirement (that the area of the middle intake hole 64c is smaller than the sum of the areas of the two intake holes 64a and 64b at the opposite ends) described above. For example, the diameter of the middle intake hole 64c may be equal to the diameter of the intake holes 64a and 64b at the opposite ends. Selection of the diameter of the middle intake hole 64c and the diameter of the intake holes 64a and 64b at the opposite ends is one of adjustment factors for setting desired in-cylinder air flow characteristics and desired flow rate characteristics. The height of the first mask part 84 and the second mask part 78 is also one of the adjustment factors.

Summary of Control according to First Embodiment

Figure 6:
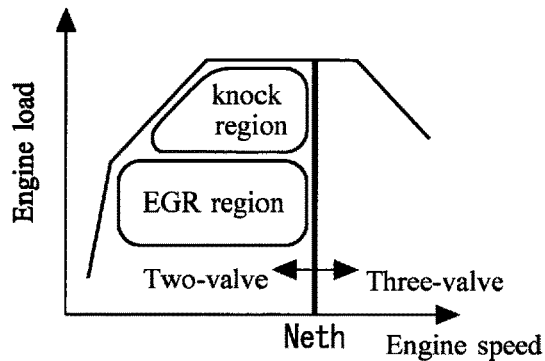
FIG. 6 is a diagram showing use regions of the drive modes in the first embodiment.

Next, an example of usage of the three drive modes in the first embodiment will be described. FIG. 6 is a diagram showing use regions of the drive modes in the first embodiment. As shown in FIG. 6, operating regions of the internal combustion engine 10 can be defined based on the engine load and the engine speed. In each operating region according to this embodiment, a stoichiometric combustion operation in which a stoichiometric air-fuel ratio is a target air-fuel ratio is performed in principle.

In this embodiment, as shown in FIG. 6, it is assumed that a low-or-medium-engine-speed and medium-load region is an EGR region where the EGR gas is introduced. If the amount of the EGR gas in the cylinder 62 increases, the effect of improving the fuel efficiency improves. However, if the EGR gas is introduced, the combustion speed slows down. In order to maintain the combustion speed in an appropriate range while introducing a large amount of EGR gas, it is favorable to enhance the tumble flow. Thus, in the EGR region, the two-valve drive mode is considered to be appropriate.

A low-engine-speed and high-load region includes a knock region where a strong knock may occur or the knock frequency may increase. Increasing the combustion speed by enhancing the tumble flow is effective to reduce the possibility or frequency of occurrence of knocks. Thus, in the knock region, the two-valve drive mode is considered to be appropriate.

Enhancement of the tumble flow also has a positive effect of promoting mixing of the air and the fuel in a high-engine-speed region (in particular, a high-engine-speed and high-load region). However, in the high-engine-speed region, it is required to increase the flow coefficient of the first branch channels 74 and the second branch channel 76 (that is, to facilitate the flow of the intake air) rather than to enhance the tumble flow. In addition, if the tumble flow is excessively strong in the high-engine-speed region, a discharge spark from the spark plug 58 may be blown out and a misfire may occur. Thus, in the high-engine-speed region, the three-valve drive mode is considered to be appropriate.

Thus, according to this embodiment, the intake variable valve device 60 is controlled so as to select the two-valve drive mode when the engine speed is equal to or lower than a predetermined threshold Neth and so as to select the three-valve drive mode when the engine speed is higher than the threshold Neth. As shown in FIG. 6, an engine speed higher than both the upper limit values of the engine speed in the EGR region and the knock region is used as the threshold Neth.

With the internal combustion engine 10, it is assumed that a stratified charge combustion operation is performed in a starting period (more specifically, over a predetermined number of cycles beginning with an initial explosion cycle immediately after starting of the engine). The process of forming the stratified air-fuel mixture used in the internal combustion engine 10 is to gather, in the vicinity of the spark plug 58, a part of the fuel sprayed from the fuel injection valve 56 without positively using the in-cylinder air flow, thereby producing an air-fuel mixture whose fuel concentration is higher in the vicinity of the spark plug 58 than in the surrounding area thereof at the time of ignition. That is, the so-called spray guide process is used. If the spray guide process is used, it is favorable to reduce production of the normal tumble flow because a strong tumble flow excessively promotes diffusion of the fuel. Thus, in the starting period referred to herein, the one-valve drive mode is considered to be appropriate. Thus, according to this embodiment, in the starting period, the intake variable valve device 60 is controlled to select the one-valve drive mode rather than the two-valve drive mode or the three-valve drive mode.

Specific Processing According to First Embodiment

Figure 7:
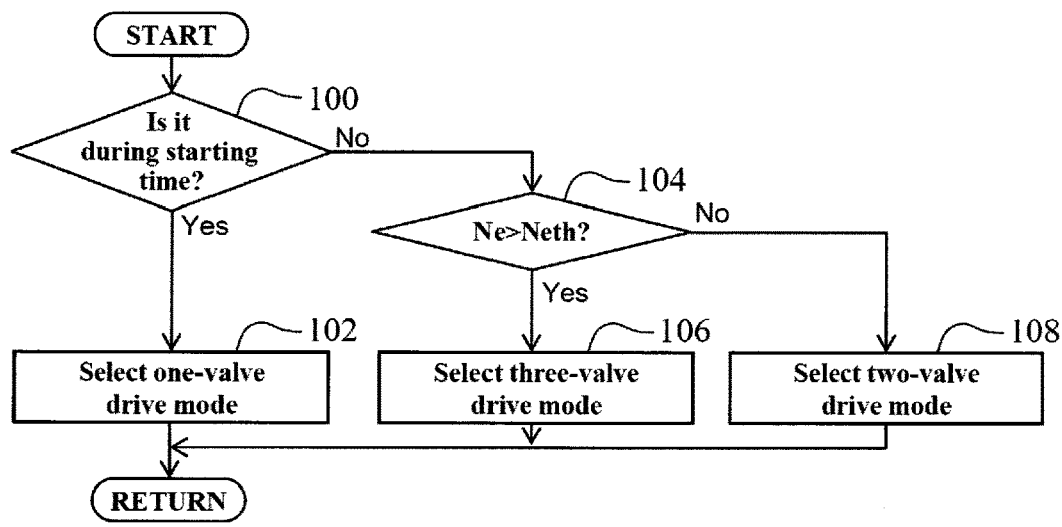
FIG. 7 is a flow chart showing a processing performed by an ECU in the first embodiment.

FIG. 7 is a flow chart showing a processing performed by the ECU 50 in the first embodiment. The routine shown in FIG. 7 is repeated at a predetermined control period after the internal combustion engine 10 starts operating.

In the routine shown in FIG. 7, the ECU 50 first determines whether it is during the starting period or not (Step 100). More specifically, the ECU 50 determines whether or not it is during a predetermined number of cycles beginning with the initial explosion cycle. If the ECU 50 determines that it is during the starting period, the ECU 50 controls the intake variable valve device 60 to select the one-valve drive mode (Step 102). The predetermined number of cycles that is regarded as the starting period may be several cycles beginning with the initial explosion cycle or include a warming-up period of the internal combustion engine 10 after starting of the internal combustion engine 10 is completed.

On the other hand, if the ECU 50 determines that it is not during the starting period, the ECU 50 determines whether or not the current engine speed determined with the crank angle sensor 52 is higher than the threshold Neth described above or not (Step 104). If the ECU 50 determines that the engine speed is higher than the threshold Neth, the ECU 50 controls the intake variable valve device 60 to select the three-valve drive mode (Step 106). On the other hand, if the ECU 50 determines that the engine speed is equal to or lower than the threshold Neth, the ECU 50 controls the intake variable valve device 60 to select the two-valve drive mode (Step 108).

According to the routine shown in FIG. 7 described above, except in the starting period determined in the processing of Step 100, the two-valve drive mode or the three-valve drive mode is selected according to the engine speed. In the high-engine-speed region where the engine speed is higher than the threshold Neth, the three-valve drive mode is selected. In this way, a high flow rate suitable for the high-engine-speed region where increasing the flow coefficient of the first branch channels 74 and the second branch channel 76 is given a higher priority than enhancing the normal tumble flow can be achieved while appropriately weakening the normal tumble flow compared with the normal tumble flow in the two-valve drive mode. Thus, the pumping loss can be reduced while reducing the possibility of occurrence of a misfire due to the discharge spark being blown out.

According to the routine described above, in the low-or-medium engine speed region where the engine speed is equal to or lower than the threshold Neth (that is, the engine speed region including the EGR region and the knock region described above), the two-valve drive mode is selected. Thus, a high tumble flow suitable for the EGR region where enhancement of the normal tumble flow is required to ensure an appropriate combustion speed can be achieved. Thus, the effect of improving the fuel efficiency by introduction of a large amount of EGR gas can be appropriately obtained. In addition, a high tumble flow suitable for the knock region where enhancement of the normal tumble flow is required to reduce the possibility of occurrence of knocks can be achieved. Thus, the possibility of occurrence of knocks can be appropriately reduced.

According to the routine described above, in the starting period in which the stratified charge combustion operation based on the spray guide process is performed, the one-valve drive mode is selected. Thus, a low rate of the in-cylinder gas suitable for the starting period in which reduction of production of the normal tumble flow is required to prevent excessive diffusion of the fuel spray can be achieved. Thus, the stratified charge combustion operation can be satisfactorily performed.

As described above, with the configuration and control of the internal combustion engine 10 according to this embodiment, the requirement for controlling the strength of the tumble flow according to the operating condition of the internal combustion engine 10 without relying on the tumble control valve can be satisfied.

In the first embodiment, switching between the two-valve drive mode and the three-valve drive mode is performed based only on the engine speed, for example. Alternatively, however, switching between the two-valve drive mode and the three-valve drive mode can be performed in the manner described below with reference to FIG. 8, for example.

Figure 8:
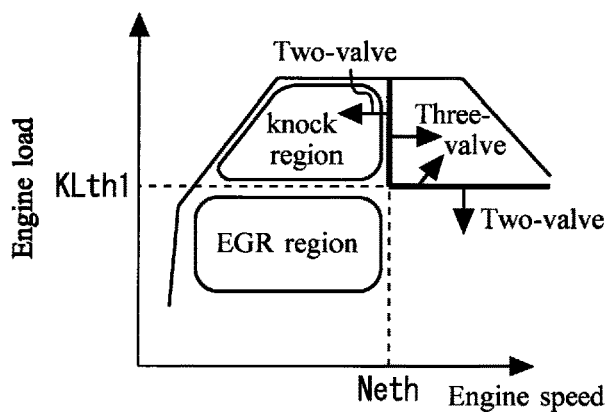
FIG. 8 is a diagram showing another example of setting of use regions of the two-valve drive mode and the three-valve drive mode.

FIG. 8 is a diagram showing another example of setting of use regions of the two-valve drive mode and the three-valve drive mode. The setting of use regions shown in FIG. 8 differs from the setting shown in FIG. 6 in that the high-engine-speed region where the three-valve drive mode is used is limited to an operating region where the engine speed is higher than the threshold Neth and the engine load is higher than a threshold KLth1 (that is, a part of the high-engine-speed region on a high-load side). As shown in the setting in FIG. 8, switching between the two-valve drive mode and the three-valve drive mode may be performed based on the engine speed and the engine load. This holds true for the second embodiment described below. The engine load can be calculated from the intake air amount and the engine speed, for example.

Second Embodiment

Next, with reference to FIG. 9, a second embodiment of the present disclosure will be described. In the following description, it is assumed that the configuration shown in FIG. 1 is used as an example of the configuration of the system according to the second embodiment.

Control According to Second Embodiment

Summary of Control According to Second Embodiment

Figure 9:
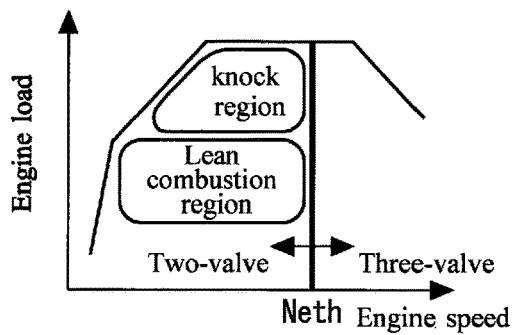
FIG. 9 is a diagram showing use regions of drive modes used in a second embodiment.

FIG. 9 is a diagram showing use regions of drive modes used in the second embodiment. This embodiment is the same as the first embodiment in that selection from among the three-valve drive mode or the two-valve drive mode is made based on whether or not the engine speed is higher than the threshold Neth, and the one-valve drive mode is selected in the starting period. This embodiment differs from the first embodiment in that the low-or-medium-engine-speed and medium-load region is not the EGR region but a lean combustion region. In the lean combustion region, a lean combustion operation is performed with a lean air-fuel ratio higher than the stoichiometric air-fuel ratio being used as a target air-fuel ratio. In the other operating region than the lean combustion region, the stoichiometric combustion operation is performed in principle.

The effect of improving the fuel efficiency can be improved by setting a significantly lean target air-fuel ratio in the lean combustion operation. However, as with the example of introducing the EGR gas, the combustion speed is slower in the lean combustion operation than in the stoichiometric combustion operation. In order to maintain the combustion speed in an appropriate range while setting a significantly lean target air-fuel ratio, it is favorable to enhance the tumble flow. Thus, in the lean combustion region, the two-valve drive mode is considered to be appropriate.

Specific Processing According to Second Embodiment

In the example of use regions shown in FIG. 9, the lean combustion region falls within the low-or-medium-engine-speed region where the engine speed is equal to or lower than the threshold Neth. Thus, according to this embodiment in which the lean combustion operation is used to improve the fuel efficiency, again, appropriate in-cylinder air flow characteristics and appropriate flow rate characteristics suitable for each operating condition can be achieved by the ECU 50 performing a routine similar to the routine according to the first embodiment shown in FIG. 7.

Third Embodiment

Next, with reference to FIGS. 10 to 13, a third embodiment of the present disclosure will be described.

Description of Configuration of System According to Third Embodiment

Figure 10:
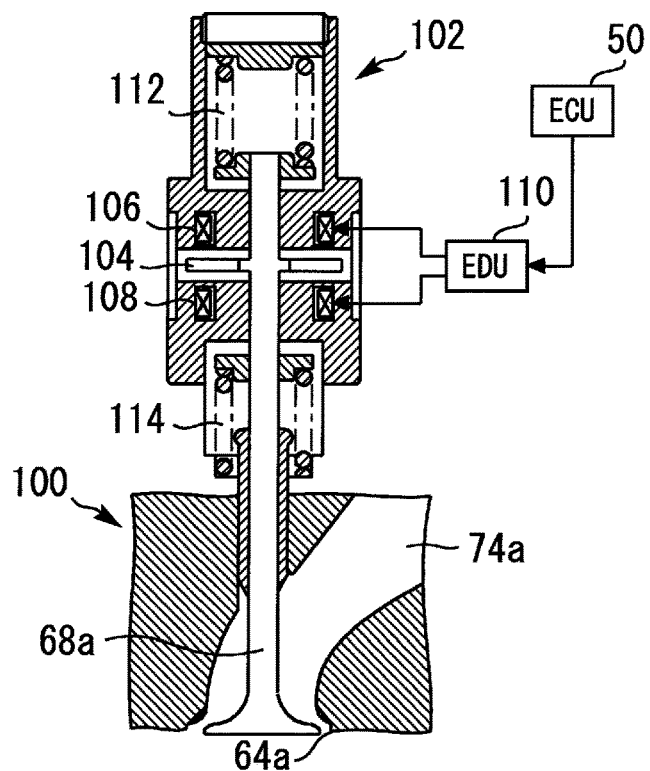
FIG. 10 is a diagram showing a schematic configuration of an intake variable valve device according to a third embodiment.

An internal combustion engine 100 according to this embodiment is the same as the internal combustion engine 10 according to the first and second embodiments except that the internal combustion engine 100 includes an intake variable valve device 102 instead of the intake variable valve device 60. The intake variable valve device 102 is a known device that electromagnetically drives the first intake valves 68 and the second intake valve 70. FIG. 10 is a diagram showing a schematic configuration of the intake variable valve device 102. Although FIG. 10 shows a drive mechanism for the first intake valve 68a, the intake variable valve device 102 also has a similar drive mechanism for each of the other first intake valve 68b and the second intake valve 70.

As shown in FIG. 10, the intake variable valve device 102 includes an armature 104 fixed to a valve shaft of the first intake valve 68a and a pair of electromagnets 106 and 108 disposed at a predetermined distance from each other with the armature 104 interposed therebetween. The predetermined distance corresponds to a maximum lift amount (that is, a peak value of the lift amount in one lift operation) of the first intake valve 68a. The pair of electromagnets 106 and 108 is electrically connected to an electric drive unit (EDU) 110. The EDU 110 controls energization of the electromagnets 106 and 108 according to a command from the ECU 50.

The first intake valve 68a is biased by a pair of springs 112 and 114 to be opened and closed, respectively.

With the intake variable valve device 102 configured as described above, by controlling energization of the pair of electromagnets 106 and 108, the armature 104 can be moved back and forth between the electromagnets 106 and 108 to open and close the intake valve 68 or 70. The first intake valve 68a can be closed by energizing the electromagnet 106 while not energizing the electromagnet 108, and the first intake valve 68a can be maintained in the closed state by keeping energizing the electromagnet 106. On the other hand, the intake valve 68 or 70 can be opened by energizing the electromagnet 108 while not energizing the electromagnet 106, and the intake valve can be maintained in the open state by keeping energizing the electromagnet 108. Thus, the timing of opening and the timing of closing of the intake valve 68 or 70 can be arbitrarily controlled by controlling the energization of the electromagnets 106 and 108. Thus, the operating angle (the length of the crank angle period for which the valve is open) can be continuously controlled as desired, and the capability of stopping operation of the intake valve 68 or 70 can also be achieved.

Control According to Third Embodiment

Summary of Control According to Third Embodiment

Figure 11:
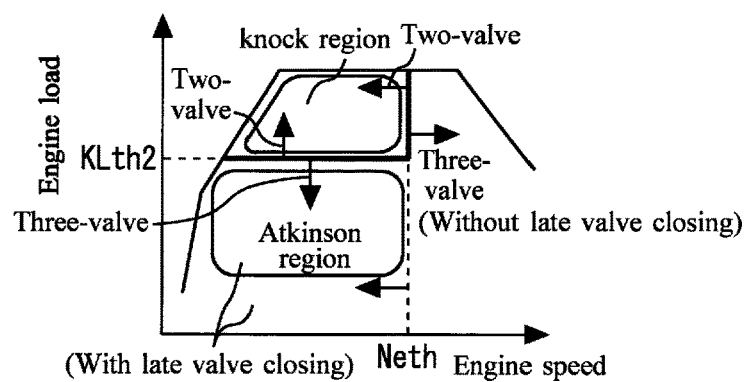
FIG. 11 is a diagram showing use regions of drive modes according to the third embodiment.

FIG. 11 is a diagram showing use regions of drive modes according to the third embodiment. This embodiment is the same as the first embodiment in that the one-valve drive mode is selected in the starting period. However, according to this embodiment, selection of the three-valve drive mode or the two-valve drive mode is made based not only on the engine speed but also on the engine load. In each operating region according to this embodiment, the stoichiometric combustion operation is performed in principle.

As shown in FIG. 11, according to this embodiment, in the low-or-medium-engine-speed and medium-load region, an Atkinson cycle based on late closing of the first intake valves 68 and the second intake valve 70 (see FIGS. 12A to 12D described later) is used. In an operating region where the Atkinson cycle is used (referred to as an "Atkinson region"), it is favorable that the first branch channels 74 and second branch channel 76 are characterized by a high flow rate in order to reduce the pumping loss. Thus, in the Atkinson region, a three-valve drive mode that involves late valve closing is considered to be appropriate.

According to this embodiment, when the engine speed is higher than the threshold Neth, the three-valve drive mode (involving no late valve closing) is selected as in the first and second embodiments. Even when the engine speed is equal to or lower than the threshold Neth, if the engine load is equal to or lower than a threshold KLth2, the three-valve drive mode involving late valve closing is selected. When the engines speed is equal to or lower than the threshold Neth, and the engine load is higher than the threshold KLth2, the two-valve drive mode is selected as in the first and second embodiments.

As the threshold KLth2, a value of the engine load between the knock region on the high load side and the Atkinson region on the low load side in the low-or-medium-engine-speed region where the engine speed is equal to or lower than the threshold Neth is used. Although a fixed value independent of the engine speed is used as the threshold KLth2 used herein, the threshold KLth2 may be a variable value that varies with the engine speed.

FIGS. 12A to 12D show valve lift curves for illustrating different drive modes of the intake valves 68a, 68b and 70 achieved by the intake variable valve device 102 according to the third embodiment. The drive modes shown in FIGS. 12A to 12C are similar to the drive modes shown in FIGS. 5A to 5C and can be achieved by the intake variable valve device 102 configured as described above. The three-valve drive mode shown in FIG. 12D involves late closing of the intake valves 68 and 70. In this three-valve drive mode, the timing of closing of the intake valves 68 and 70 is retarded by a crank angle period required to effectively achieve the Atkinson cycle, compared with the valve lift curve in the example where no late valve closing is involved (shown by the dashed line). The intake variable valve device of the internal combustion engine 100 according to this embodiment is not limited to the intake variable valve device 102 of the electromagnetically driving type as far as the device can operate in the drive modes shown in FIGS. 12A to 12D, and therefore any known mechanical variable valve device may be used.

Specific Processing According to Third Embodiment

FIG. 13 is a flow chart showing a processing performed by the ECU 50 in the third embodiment. The processing in Steps 100 and 104 of the routine shown in FIG. 13 is the same as those according to the first embodiment described above.

In this routine, if the ECU 50 determines in Step 100 that it is during the starting period, the ECU 50 controls the intake variable valve device 102 to select the one-valve drive mode (Step 200). If the ECU 50 determines in Step 104 that the engine speed is higher than the threshold Neth, the ECU 50 controls the intake variable valve device 102 to select the three-valve drive mode that involves no late closing of the intake valves 68 and 70 (Step 202).

If the ECU 50 determines that the engine speed is equal to or lower than the threshold Neth, unlike the routine shown in FIG. 7, the ECU 50 determines whether or not the current engine load is equal to or lower than the threshold KLth2 described above (Step 204).

If the ECU 50 determines in Step 204 that the engine load is equal to or lower than the threshold KLth2, the ECU 50 controls the intake variable valve device 102 to select the three-valve drive mode that involves late closing of the intake valves 68 and 70 (Step 206). If the ECU 50 determines that the engine load is higher than the threshold KLth2, the ECU 50 controls the intake variable valve device 102 to select the two-valve drive mode (Step 208).

According to the routine shown in FIG. 13 described above, in the low-or-medium-engine-speed and medium-load region (that is, the Atkinson region), the three-valve drive mode suitable for the Atkinson cycle based on late closing of the intake valves 68 and 70 is used. Thus, the fuel efficiency can be improved by using the Atkinson cycle while enhancing the effect of reducing the pumping loss. Furthermore, in the high-engine-speed region and the knock region other than the Atkinson region, and during the starting period, the same effects as those in the first embodiment can be achieved.

According to the third embodiment, the Atkinson cycle is achieved with a retard of the timing of closing of the intake valves 68 and 70. As an alternative, however, the Atkinson cycle may be achieved by advancing the timing of closing of the intake valves 68 and 70. Furthermore, the Atkinson cycle may also be achieved by retarding or advancing the timing of closing of one of the first intake valves 68 and the second intake valve 70, rather than by retarding or advancing the timing of closing of both of the first intake valves 68 and the second intake valve 70.

Modifications of First to Third Embodiments

In the first to third embodiments described above, to help producing the intended in-cylinder air flow, the mask parts (the first mask part 84 and the second mask part 78) are provided around the intake holes 64a and 64b at the opposite ends and the middle intake hole 64c as shown in FIG. 2. As an alternative, the mask parts may be provided in manners as shown in FIGS. 14A and 14B described below, for example.

FIGS. 14A and 14B show other examples of the mask parts. In the example shown in FIG. 14A, the second mask parts 78 around the intake holes 64a and 64b at the opposite ends are not provided on a combustion chamber top surface 116a, and only the first mask part 84 around the middle intake hole 64c is provided. The configuration shown in FIG. 14A may be adopted if the intended normal tumble flow can be produced by appropriately designing the first branch channels 74 (not shown in FIG. 14A) without using the second mask parts 78.

In the example shown in FIG. 14B, the second mask parts 78 (78a and 78b) around the intake holes 64a and 64b at the opposite ends are provided on the combustion chamber top surface 116a, and the first mask part 84 around the middle intake hole 64c is not provided. The configuration shown in FIG. 14B may be adopted if the intended in-cylinder air flow can be produced by appropriately designing the second branch channel 76 (not shown in FIG. 14B) without using the first mask part 84. For example, if a tumble flow in the opposite direction to the normal tumble flow shown in FIG. 3A (that is, a reverse tumble flow that descends on the intake side and ascends on the exhaust side) is produced by appropriately designing the second branch channel 76, the first mask part 84 may be omitted. Unlike the examples shown in FIGS. 14A and 14B, if the first branch channels 74 and the second branch channel 76 need no help of a mask part to produce the intended in-cylinder air flow, both the first mask part 84 and the second mask parts 78 may be omitted.

In the first to third embodiments described above, as shown in FIGS. 5A to 5C or FIGS. 12A to 12D, the valve operation is switched between the state where the intake valve 68 or 70 is normally opened and closed and the state where the intake valve 68 or 70 is inoperative. As an alternative, the valve operation in the control of the in-cylinder air flow according to the present disclosure may be switched as shown in FIGS. 15A to 15C or FIGS. 16A to 16C described below.

FIGS. 15A to 15C show valve lift curves for illustrating another example of drive modes of the intake valves 68a, 68b and 70. The drive mode shown in FIG. 15C (which corresponds to a "first drive mode" according to the present disclosure) is the same as the three-valve drive mode described above.

In the drive mode shown in FIG. 15A (which corresponds to a "third drive mode" according to the present disclosure), the second intake valve 70 at the middle is opened and closed in the same manner as in the first drive mode, and the first intake valves 68 at the opposite ends are opened and closed with a lift amount smaller than the lift amount of the first intake valves 68 in the first drive mode. The third drive mode can be alternative to the one-valve drive mode described above.

In the drive mode shown in FIG. 15B (which corresponds to a "second drive mode" according to the present disclosure), the first intake valves 68 at the opposite ends are opened and closed in the same manner as in the first drive mode, and the second intake valve 70 at the middle is opened and closed with a lift amount smaller than the lift amount of the second intake valve 70 in the first drive mode. The second drive mode can be alternative to the two-valve drive mode described above.

An intake variable valve device that achieves the drive modes shown in FIGS. 15A to 15C may be configured as described below, for example. That is, the second cams 90, which are zero lift cams, of the intake variable valve device 60 may be replaced with second cams having a profile that provides a lift amount smaller than the lift amount according to the profile of the first cams 88 as shown in FIGS. 15A and 15B.

FIGS. 16A to 16C show valve lift curves for illustrating another example of drive modes of the intake valves 68a, 68b and 70. The drive mode shown in FIG. 16C (which corresponds to the "first drive mode" according to the present disclosure) is the same as the three-valve drive mode described above.

In the drive mode shown in FIG. 16A (which corresponds to the "third drive mode" according to the present disclosure), the second intake valve 70 at the middle is opened and closed in the same manner as in the first drive mode, and the first intake valves 68 at the opposite ends are opened and closed with an operating angle smaller than the operating angle of the first intake valves 68 in the first drive mode. The third drive mode can be alternative to the one-valve drive mode described above.

In the drive mode shown in FIG. 16B (which corresponds to the "second drive mode" according to the present disclosure), the first intake valves 68 at the opposite ends are opened and closed in the same manner as in the first drive mode, and the second intake valve 70 at the middle is opened and closed with an operating angle smaller than the operating angle of the second intake valve 70 in the first drive mode. The second drive mode can be alternative to the two-valve drive mode described above.

As in the example shown in FIGS. 15A to 15C, an intake variable valve device that achieves the drive modes shown in FIGS. 16A to 16C may be configured as described below, for example. That is, the second cams 90, which are zero lift cams, of the intake variable valve device 60 described above may be replaced with second cams having a profile that provides an operating angle smaller than the operating angle according to the profile of the first cams 88 as shown in FIGS. 16A and 16B.

In the example shown in FIGS. 15A to 15C or FIGS. 16A to 16C, the strength of the normal tumble flow in each drive mode can be controlled by using the lift amount or operating angle of the intake valve 68 or 70 whose lift amount or operating angle is set to be smaller. Furthermore, if the intake variable valve device used in this control can continuously change the lift amount or operating angle of the intake valve 68 or 70 whose lift amount or operating angle is set to be smaller, the strength of the normal tumble flow can be continuously changed in the third or second drive mode by continuously changing the lift amount or operating angle. Furthermore, depending on the configuration of the intake variable valve device used to achieve the smaller operating angle, only the operating angle alone can be reduced and the lift amount can be kept unchanged, unlike the example shown in FIGS. 16A to 16C.

In the third embodiment, as shown in FIG. 2, the three intake holes 64a, 64b, and 64c are arranged along an arc about the axis of the cylinder, for example. However, the arrangement of the three intake holes according to the present disclosure is not limited to the example described above, and the three intake holes may be arranged as described below with reference to FIGS. 17A and 17B, for example.

Figure 17A:
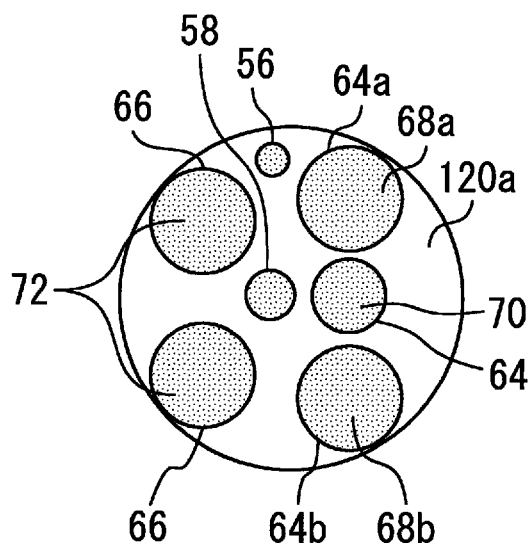
FIGS. 17A and 17B show other examples of the arrangement of three intake holes.
Figure 17B:
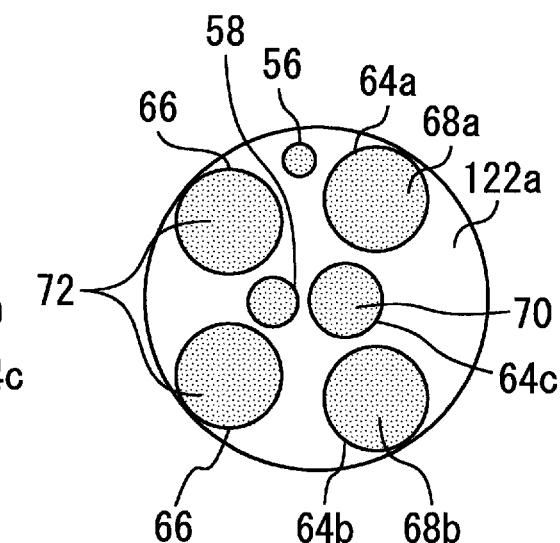

FIGS. 17A and 17B show other examples of the arrangement of the three intake holes 64a, 64b, and 64c. In the arrangement example shown in FIG. 17A, the three intake holes 64a, 64b, and 64c are linearly formed in a combustion chamber top surface 120a. In the arrangement example shown in FIG. 17B, the three intake holes 64a, 64b, and 64c are formed in a combustion chamber top surface 122a along an arc that is inverse to the arc in the arrangement example shown in FIG. 2. That is, the middle intake hole 64c is closer to the center of the combustion chamber than the intake holes 64a and 64b at the opposite ends.

Fourth Embodiment

Next, a fourth embodiment of the present disclosure will be described with reference to FIGS. 18 to 22. In the following description, the configuration shown in FIG. 1 is used as an example of the configuration of a system according to the fourth embodiment. However, the fourth embodiment differs from the first and second embodiments in that the first cam 88c that drives the second intake valve 70 has a profile described later with reference to FIG. 19.

[Problem in Execution of Scavenging Promotion Control]

According to this embodiment, a scavenging promotion control is performed to reduce the in-cylinder remaining gas, in order to improve the charging efficiency of the intake air and reduce the possibility of occurrence of knocks in the high-load region. The internal combustion engine 10 is a supercharged engine, and the intake air pressure is higher than the exhaust gas pressure in the operating region on the high load side. The scavenging promotion control is to set a valve overlap period, in which the period in which the intake valve is opened and the period in which the exhaust valve 72 is opened overlap with each other, to be in the vicinity of the exhaust top dead center under an operating condition where the intake air pressure is higher than the exhaust gas pressure. Whether to use the first intake valve 68 or the second intake valve 70 to set the valve overlap period is a characteristic of this embodiment and will be described later with reference to FIG. 19.

In the scavenging promotion control described above, the in-cylinder remaining gas can be purged from the cylinder 62 toward the exhaust channel 14 by the intake air at a high pressure from the intake channel 12 in the valve overlap period. Even in a naturally aspirated engine, as with the internal combustion engine 10, scavenging promotion can be achieved by using intake and exhaust pulsation. Thus, the scavenging promotion control may also be performed in the naturally aspirated engine.

Figure 18:
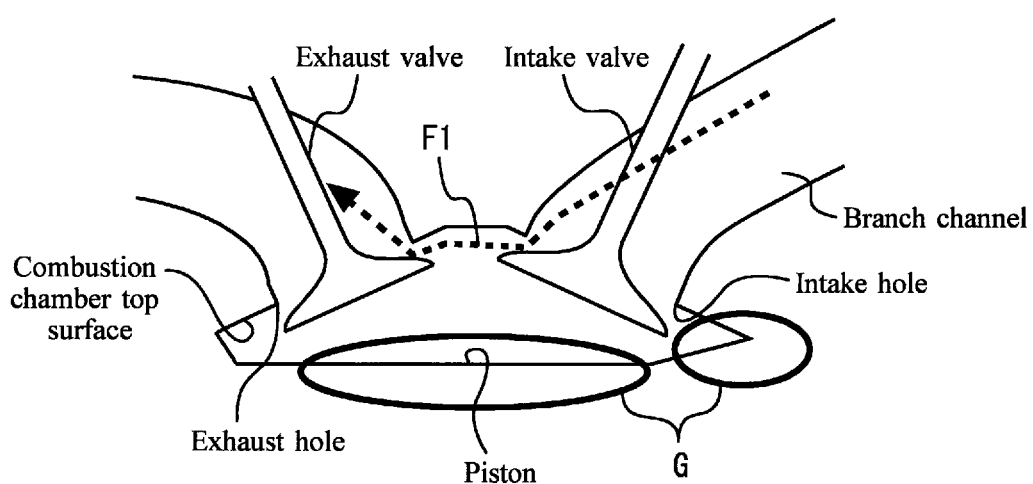
FIG. 18 is a diagram showing a common configuration of a cylinder and its periphery of an internal combustion engine for illustrating a problem in execution of the scavenging promotion control.

FIG. 18 is a diagram showing a common configuration of a cylinder and its periphery of an internal combustion engine for illustrating a problem in execution of the scavenging promotion control. When the scavenging promotion control is performed, as shown by the symbol "F1" in FIG. 18, most of the intake air (fresh air) flowing into the cylinder through the intake hole tends to flow to the exhaust hole closest to the intake hole along the shortest path. Thus, when the scavenging promotion control is performed, blow-by of the fresh air from the intake channel to the exhaust channel is likely to occur. The blow-by of the fresh air may lead to a decrease of the charging efficiency of the intake air. In addition, depending on the way of fuel injection, the fresh air may contain fuel, and, as a result, the fuel efficiency may decrease. Furthermore, when the normal tumble flow is produced in the cylinder, the air flow from the intake side to the exhaust side in the vicinity of the combustion chamber top surface is facilitated, so that the blow-by of the fresh air is more likely to occur. However, if a mask part is provided between the intake hole and the exhaust hole to block the air flow F1, production of the normal tumble flow is hindered.

In addition, as shown by the symbol "G" in FIG. 18, burned gas is likely to remain without being scavenged at a position distant from the air flow F1 (a position close to the top surface of the piston and a position close to the wall of the cylinder bore).

Essential Hardware Configuration to be Noted in Fourth Embodiment (Configuration of Intake Variable Valve Device)

Figure 19:
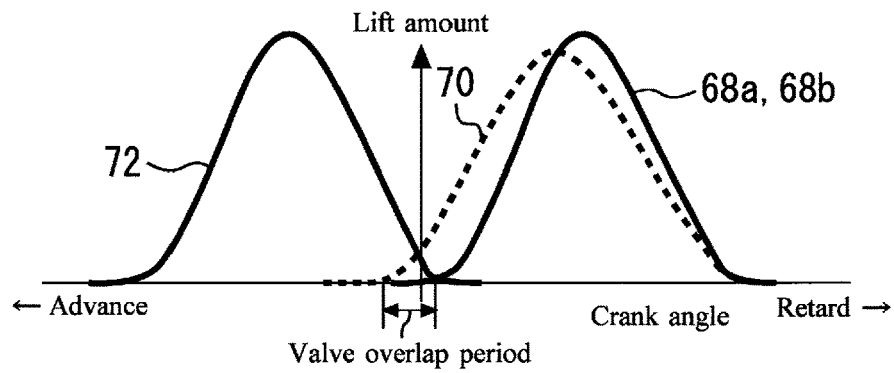
FIG. 19 shows valve lift curves for the intake valves and a valve lift curve for the exhaust valves achieved by the profile of first cams used in the third embodiment.

FIG. 19 shows valve lift curves for the intake valves 68 and 70 and a valve lift curve for the exhaust valves 72 achieved by the profile of the first cams 88a to 88c used in the third embodiment.

This embodiment differs from the first and second embodiments in that the profile of the first cam 88c associated with the second intake valve 70 at the middle is different from the profile of the first cams 88a and 88b associated with the first intake valves 68a and 68b at the opposite ends. More specifically, the profile of the first cam 88c is configured such that the timing of opening of the second intake valve 70 is advanced with respect to the timing of opening of the first intake valve 68 that is opened in the vicinity of the exhaust top dead center. With such a configuration, there is a valve overlap period between the second intake valve 70 and the exhaust valve 72, and there is no valve overlap period between the first intake valve 68 and the exhaust valve 72. In addition, with such a configuration, the first intake valve 68 is opened after the exhaust valve 72 is closed.

(Configuration of Combustion Chamber Top Surface)

The top surface 62a of the internal combustion engine 10 according to this embodiment is configured as shown in FIG. 2. With such a configuration, of the three intake holes 64a, 64b, and 64c, the middle intake hole 64c is disposed farthest from the exhaust holes 66. In addition, the first mask part 84 is provided on the top surface 62a in the form of a protrusion that surrounds the middle intake hole 64c on the side of the center of the combustion chamber in the perpendicular direction D in the view of the top surface 62a viewed from below along the axis of the cylinder as shown in FIG. 2.

Control According to Fourth Embodiment

Summary of Control According to Fourth Embodiment

Figure 20:
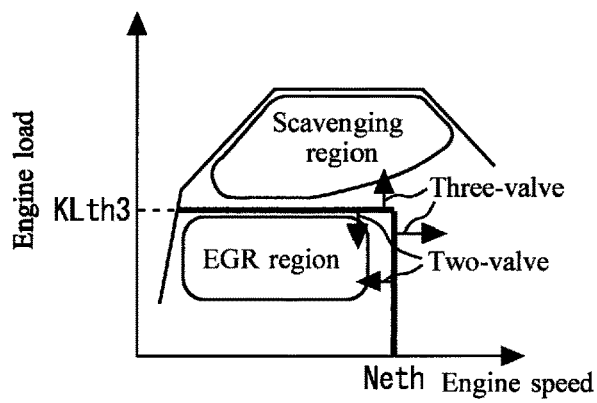
FIG. 20 is a diagram showing use regions of drive modes according to a fourth embodiment.

FIG. 20 is a diagram showing use regions of drive modes according to the fourth embodiment. As shown in FIG. 20, a scavenging region where the scavenging promotion control is performed is an operating region on the high load side where the intake air pressure is higher than the exhaust gas pressure because of supercharging. According to this embodiment, in the scavenging region as well as the highengine-speed region, the three-valve drive mode is selected. Thus, in the scavenging region, the valve lift curves shown in FIG. 19 are used.

A threshold KLth3 shown in FIG. 20 is a value of the engine load between the scavenging region on the high load side and the EGR region on the low load side in the low-or-medium-engine-speed region where the engine speed is equal to or lower than the threshold Neth. According to this embodiment, in an operating region where the engine speed is equal to or lower than the threshold Neth and the engine load is equal to or lower than the threshold KLth3 (an operating region including the EGR region), the two-valve drive mode is selected.

Specific Processing According to Second Embodiment

Figure 21:
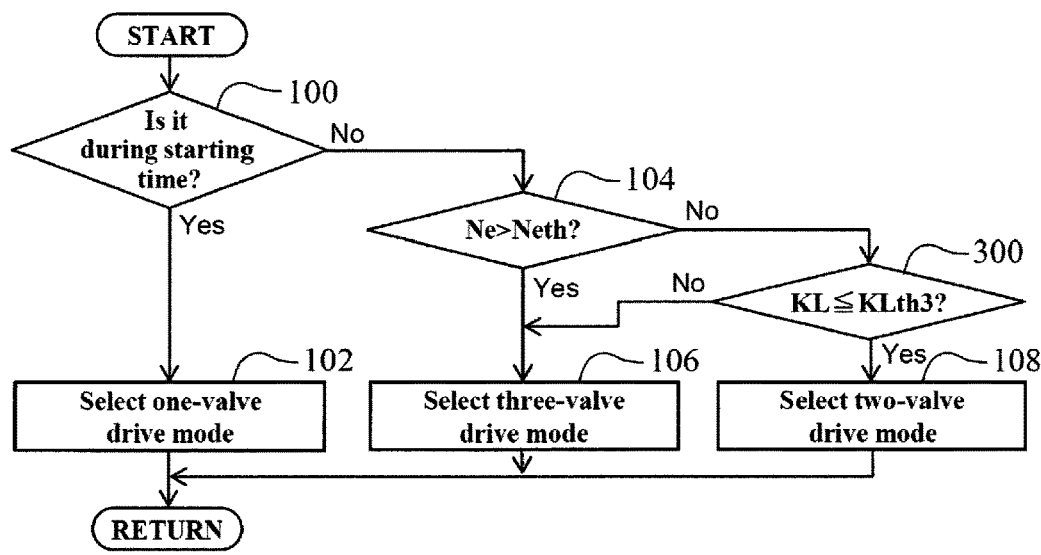
FIG. 21 is a flow chart showing a processing performed by the ECU in the fourth embodiment.

FIG. 21 is a flow chart showing a processing performed by the ECU 50 in the fourth embodiment. The processing in Steps 100 to 108 of the routine shown in FIG. 21 is the same as those according to the first embodiment described above, and descriptions thereof will be omitted or simplified.

In this routine, if the ECU 50 determines in Step 104 that the engine speed is equal to or lower than the threshold Neth, the ECU 50 determines whether or not the current engine load is equal to or lower than the threshold KLth3 described above (Step 300). If the ECU 50 determines that the engine load is equal to or lower than the threshold KLth3, the ECU 50 controls the intake variable valve device 60 to select the two-valve drive mode (Step 108).

If the ECU 50 determines in Step 104 that the engine speed is higher than the threshold Neth, or if the result of the determination in Step 300 is negative and thus the ECU 50 determines that the engine speed is equal to or lower than the threshold Neth and the engine load is higher than the threshold KLth3, the ECU 50 controls the intake variable valve device 60 to select the three-valve drive mode (Step 106).

According to the routine shown in FIG. 21 that uses the thresholds Neth and KLth3 that are set as shown in FIG. 20, in the scavenging region, the three-valve drive mode is selected. According to this embodiment, the first cams 88*a* to 88*b* have a profile corresponding to the valve lift curves shown in FIG. 19. Thus, in the scavenging promotion control, there is a valve overlap period between the second intake valve 70 and the exhaust valve 72, and the first intake valve 68 is opened after the exhaust valve 72 is closed.

FIGS. 22A and 22B are diagrams for illustrating reduction of blow-by of the fresh air and achievement of efficient scavenging by the control according to the fourth embodiment. More specifically, FIG. 22A is a view of the top surface 62*a* viewed from below along the axis of the cylinder, and FIG. 22B is a view of the combustion chamber and its periphery viewed from the arrow H in FIG. 22A, showing the second intake valve 70 on the intake side and the exhaust valve 72 on the exhaust side.

According to the valve lift curves shown in FIG. 19, in the valve overlap period (that is, during scavenging), the intake air flows into the cylinder 62 through the intake hole 64*c* associated with the second intake valve 70 that has just started opening and is in a small lift state. At this point in time, since the first mask part 84 is provided around the intake hole 64*c* on the side closer to the center of the combustion chamber, the intake air flows into the cylinder 62 along the outer periphery of the combustion chamber as indicated by the symbols "G2" and "G3" in FIGS. 22A and 22B. Of the three intake holes 64*a*, 64*b*, and 64*c*, the intake hole 64*c* provided with the second intake valve 70 is disposed farthest from the exhaust hole 66. Furthermore, the first intake valves 68 that open and close the first branch channels 74 that produce the normal tumble flow that facilitates blow-by of the fresh air during scavenging are closed during scavenging. Thus, according to the configuration and control according to this embodiment, reduction of blow-by of fresh air and efficient scavenging can be achieved as described below.

That is, the intake air flowing into the cylinder 62 through the intake hole 64*c* during the valve overlap period is less likely to flow along the shortest path indicated by the symbol "F1" in FIG. 18. Thus, blow-by of the fresh air can be effectively reduced. In addition, as shown by the intake air flows "G2" and "G3", the intake air flowing into the cylinder 62 during the valve overlap period tends to flow through the part where the burned gas tends to remain denoted by the symbol "G" in FIG. 18. Thus, discharge (that is, scavenging) of the burned gas from the cylinder 62 can be efficiently achieved. In addition, since there is no need to provide a mask part to reduce blow-by of the fresh air between the intake holes 64*a* and 64*b* at the opposite ends and the exhaust holes 66, blow-by of the fresh air can be reduced without hindering production of the normal tumble flow by the air flow into the cylinder 62 from the first branch channels 74.

The three-valve drive mode, the two-valve drive mode and the one-valve drive mode in the first to fourth embodiments described above correspond to the "first drive mode", the "second drive mode" and the "third drive mode" according to the present disclosure, respectively.

In the fourth embodiment described above, the timing of opening of the second intake valve 70 is advanced with respect to the timing of opening of the first intake valves 68 such that only the period in which the second intake valve 70 is open overlaps with the period in which the exhaust valve 72 is open. However, the method of making only the period in which the second intake valve 70 is open overlap with the period in which the exhaust valve 72 is open is not limited to the example described above, and the period in which the second intake valve 70 is open alone can also be made to overlap with the period in which the exhaust valve 72 is open as described below with reference to FIG. 23, for example.

FIG. 23 is a diagram for illustrating another method of making only the period in which the second intake valve 70 is open overlap with the period in which the exhaust valve 72 is open. In the example shown in FIG. 23, the second intake valve 70 is set to open for a short period that overlaps with the period in which the exhaust valve 72 is open in the vicinity of the exhaust top dead center. In addition, the lift amount of the second intake valve 70 is set to be a small lift amount that corresponds to the short period in which the second intake valve 70 is open (that is, the small operating angle of the second intake valve 70). In this example, after the second intake valve 70 is closed, only the two first intake valves 68*a* and 68*b* are open. Thus, an in-cylinder air flow having characteristics similar to the characteristics in the two-valve drive mode shown in FIG. 5B can be produced. Thus, if the valve lift curves shown in FIG. 23 are used in the low-engine-speed and high-load region included in the scavenging region, the effect of reducing the possibility of occurrence of knocks due to efficient scavenging and the effect of reducing the possibility of occurrence of knocks due to enhancement of the normal tumble flow can be provided.

In the configuration in which the valve lift curves shown in FIG. 23 are used in the scavenging region, in order to allow the valve lift curves shown in FIG. 5C to be used instead of the valve lift curves shown in FIG. 23 in the use region (the high-engine-speed region shown in FIG. 6, for example) of the three-valve drive mode excluding the scavenging region, the intake variable valve device may be configured as described below. That is, for example, in the intake variable valve device 60, an additional set of a cam and a rocker arm for driving the second intake valve 70 at the middle may be provided. More specifically, the first cam 88c may be configured to have a profile that corresponds to the valve lift curve that provides a small operating angle and a small lift amount shown in FIG. 23, the second cam 90c may be configured to have a profile of a zero lift cam, and the additional third cam may be configured to have the same profile as the first cams 88a and 88b for the first intake valves 68. In addition, an additional coupling pin 96 may be provided to switchably couple a third rocker arm associated with the third cam and the second rocker arm 94 to each other and decouple the third and second rocker arms from each other. With this configuration, during operation of the internal combustion engine 10, the scavenging region and the use region (the high-engine-speed region, for example) of the three-valve drive mode excluding the scavenging region may be discriminated, and the second intake valve 70 may be driven by using the first cam 88c or the third cam according to the result of the discrimination. This holds true for the fourth embodiment in which the valve lift curves shown in FIG. 19 are used rather than the valve lift curves shown in FIG. 23.

In the fourth embodiment, the second mask parts 78 and the first mask part 84 are provided around the intake holes 64a and 64b at the opposite ends and the middle intake hole 64c, respectively. However, the second mask part 84 is likely to block the air flow indicated by the symbol "G2" in FIG. 22A. Thus, the reduction of blow-by of the fresh air and the efficient scavenging described above can be more effectively achieved during the scavenging promotion control if the second mask part 84 is omitted as shown in FIG. 14A.

Modifications of First to Fourth Embodiments

According to the present disclosure, when three intake holes are arranged in an arc, the three intake holes may be provided on the combustion chamber top surface in an arc having a curvature different from that of a circle.

The fuel injection valve used in the present disclosure is not limited to the valve that directly injects fuel into the cylinder, such as the fuel injection valve 56, and may be a valve (of the so-called port injection type) that injects fuel into the intake channel (more specifically, a branch channel). Even when the port injection type is used, a stratified air-fuel mixture can be produced around the spark plug at the time of ignition during the third drive mode if a fuel injection valve is disposed in the second branch channel connected to the middle intake hole, for example. Further, when the port injection type is used, it is required to include one or a plurality of fuel injection valves to enable fuel to be injected into the cylinder during the second drive mode in which the middle intake hole is closed by the second intake valve. Furthermore, the routine, for example, according to the first embodiment shown in FIG. 7 may also be performed in the internal combustion engine of the port injection type.

The examples and modifications described with regard to the embodiments described above may be combined as required in a manner other than those explicitly described, and may be modified in various ways without departing from the gist of the present disclosure.

What is claimed is:
1. A control device for an internal combustion engine that includes:
   a spark plug disposed at a combustion chamber top surface of a cylinder;
   a fuel injection valve configured to supply a fuel into the cylinder;
   three intake holes formed in the combustion chamber top surface, the area of a middle intake hole of the three intake holes being smaller than the sum of the areas of intake holes at opposite ends;
   at least one exhaust hole formed in the combustion chamber top surface;
   first intake valves configured to open and close the intake holes at the opposite ends;
   a second intake valve configured to open and close the middle intake hole;
   at least one exhaust valve configured to open and close the at least one exhaust hole;
   an intake variable valve device configured to separately control opening and closing of the first intake valves and opening and closing of the second intake valve; and
   an intake channel that includes first branch channels and a second branch channel, the first branch channels being connected to the intake holes at the opposite ends and being configured to produce a normal tumble flow that ascends on an intake side and descends on an exhaust side in the cylinder, and the second branch channel being connected to the middle intake hole and being configured such that a flow rate of intake air passing through a space on a side opposite to a center of a combustion chamber is greater than a flow rate of intake air passing through a space on a side of the middle intake hole closer to the center of the combustion chamber,
   wherein the control device is programmed, where increasing a flow coefficient of the first branch channels and the second branch channel is given a higher priority than enhancing a strength of the normal tumble flow, to control the intake variable valve device so as to select a first drive mode in which both the first intake valves and the second intake valve are opened and closed,
   wherein the control device is programmed, where the strength of the normal tumble flow is enhanced, to control the intake variable valve device so as to select a second drive mode in which the first intake valves are opened and closed while the second intake valve is neither opened nor closed, or the first intake valves are opened and closed while at least one of a lift amount and an operating angle of the second intake valve is set to be smaller than at least one of a lift amount and an operating angle of the second intake valve in the first drive mode, and
   wherein the control device is programmed, where production of the normal tumble flow is reduced, to control the intake variable valve device so as to select a third drive mode in which the second intake valve is opened and closed while the first intake valves are neither opened nor closed, or the second intake valve is opened and closed while at least one of a lift amount and an operating angle of the first intake valves is set to be smaller than at least one of a lift amount and an operating angle of the first intake valves in the first drive mode.

2. The control device according to claim 1,
wherein the control device is programmed to control the intake variable valve device so as to select the first drive mode if an engine speed is higher than a threshold, and control the intake variable valve device so as to select the second drive mode if the engine speed is equal to or lower than the threshold.

3. The control device according to claim 1,
wherein the internal combustion engine includes an EGR device that is configured to feed a part of exhaust gas flowing in an exhaust channel back to the intake channel as an EGR gas, and
wherein the control device is programmed to control the intake variable valve device so as to select the second drive mode if the EGR gas is fed back to the intake channel by using the EGR device.

4. The control device according to claim 1,
wherein the control device is programmed to control the intake variable valve device so as to select the second drive mode if a lean combustion operation is performed at a lean air-fuel ratio higher than a stoichiometric air-fuel ratio.

5. The control device according to claim 1,
wherein the control device is programmed to control the intake variable valve device so as to select the first drive mode if an Atkinson cycle is used by retarding or advancing a timing of closing of at least one of the first intake valves and the second intake valve.

6. The control device according to claim 1,
wherein the control device is programmed to control the intake variable valve device so as to select the second drive mode in a knock region on a low-engine-speed and high-load side.

7. The control device according to claim 1,
wherein the control device is programmed to control the intake variable valve device so as to select the third drive mode if a stratified charge combustion operation is performed at a time of starting of the internal combustion engine.

8. The control device according to claim 1,
wherein, of the three intake holes, the middle intake hole is disposed farthest from the at least one exhaust hole,
wherein a first mask part is provided around the middle intake hole in a form of a protrusion that surrounds the middle intake hole on a side closer to the center of the combustion chamber in a direction perpendicular to an axis of a crankshaft in a view of the combustion chamber top surface viewed from below along an axis of the cylinder, and
wherein a valve overlap period in which only a period in which the second intake valve is open overlaps with a period in which the at least one exhaust valve is open is provided if the first drive mode is selected in a scavenging region where an intake air pressure is higher than an exhaust gas pressure.

9. The control device according to claim 1,
wherein a first mask part is provided around the middle intake hole in a form of a protrusion that surrounds the middle intake hole on a side closer to the center of the combustion chamber in a direction perpendicular to an axis of a crankshaft in a view of the combustion chamber top surface viewed from below along an axis of the cylinder.

10. The control device according to claim 1,
wherein second mask parts are provided around the intake holes at the opposite ends in a form of a protrusion that surrounds a corresponding intake hole on a side closer to an outer periphery of the combustion chamber in a direction perpendicular to an axis of a crankshaft in a view of the combustion chamber top surface viewed from below along an axis of the cylinder.

* * * * *